United States Patent [19]
Matsushita et al.

[11] Patent Number: 5,486,729
[45] Date of Patent: Jan. 23, 1996

[54] METHOD AND APPARATUS FOR CONTROLLING A MAGNETIC BEARING

[75] Inventors: Osami Matsushita; Mitsuho Yoneyama; Naohiko Takahashi, all of Ibaraki; Yasuo Fukushima, Tsuchiura; Minoru Hiroshima, Ushiku; Tadashi Kaneki, Tsuchiura; Yoshiaki Abe; Naofumi Sakanashi, both of Ibaraki, all of Japan

[73] Assignee: Hitachi, Ltd., Tokyo, Japan

[21] Appl. No.: 26,760

[22] Filed: Mar. 5, 1993

[30] Foreign Application Priority Data

Mar. 9, 1992 [JP] Japan ................................ 4-086027
Nov. 4, 1992 [JP] Japan ................................ 4-295258

[51] Int. Cl.⁶ .................................................. H02K 7/09
[52] U.S. Cl. .................................................. 310/90.5
[58] Field of Search .......................... 310/90.5; 318/611, 318/623, 648; 73/461

[56] References Cited

U.S. PATENT DOCUMENTS

| | | | |
|---|---|---|---|
| 4,121,143 | 10/1978 | Habermann et al. | 318/629 |
| 4,626,754 | 12/1986 | Habermann et al. | 310/90.5 |
| 4,697,128 | 9/1987 | Matsushita et al. | 310/90.5 |
| 4,839,550 | 6/1989 | Mizuno et al. | 310/90.5 |
| 4,841,212 | 6/1989 | Matsushita et al. | 310/90.5 |
| 4,885,491 | 12/1989 | Hiyama et al. | 310/90.5 |
| 4,912,387 | 3/1990 | Moulds, III | 310/90.5 |
| 5,142,177 | 8/1992 | Higuchi et al. | 310/90.5 |
| 5,202,824 | 4/1993 | Chen | 310/90.5 |
| 5,247,219 | 9/1993 | Nakagawa et al. | 310/90.5 |
| 5,256,952 | 10/1993 | Yoneyama et al. | 310/90.5 |

FOREIGN PATENT DOCUMENTS

| | | |
|---|---|---|
| 201894 | 11/1986 | European Pat. Off. . |
| 381898 | 12/1989 | European Pat. Off. . |
| 2336603 | 12/1975 | France . |
| 2336602 | 7/1977 | France . |
| 1-126424 | 5/1989 | Japan ................ 310/90.5 |
| 3-124242 | 5/1991 | Japan ................ 310/90.5 |

*Primary Examiner*—Clayton E. LaBalle
*Attorney, Agent, or Firm*—Antonelli, Terry, Stout & Kraus

[57] ABSTRACT

A controller of magnetic bearing controls the rotor speed with a reduced drive current while suppressing the rotor vibration. The controller implements the ABS control, N-cross control, N-straight control and FF control in proper combination in addition to the basic PID control. A computer in the controller determines the activation of each control in accordance with a predetermined table of control plan in response to the detected rotor speed.

33 Claims, 24 Drawing Sheets

FIG. 8

| ITEM | PID | CRITICAL DAMP | N-CROSS | ABS | FF |
|---|---|---|---|---|---|
| PATENT NO. |  | JP-A-52-93853 | JP-A-61-262225 | JP-A-52-93852 | JP-A-3-127184 |
| APPLICABLE SPEED RANGE | WHOLE RANGE | DURING RESONANT POINT PASSAGE | DURING RESONANT POINT PASSAGE | AFTER RESONANT POINT PASSAGE | DURING RESONANT POINT PASSAGE |
| RESONANCE CONTROL CURRENT | LARGE | MEDIUM | SMALL |  | MEDIUM |
| CONTROL CURRENT AFTER RESONANT POINT PASSAGE | SMALL | (UNNEEDED) | (UNNEEDED) | VERY SMALL | (UNNEEDED) |

FIG. 9

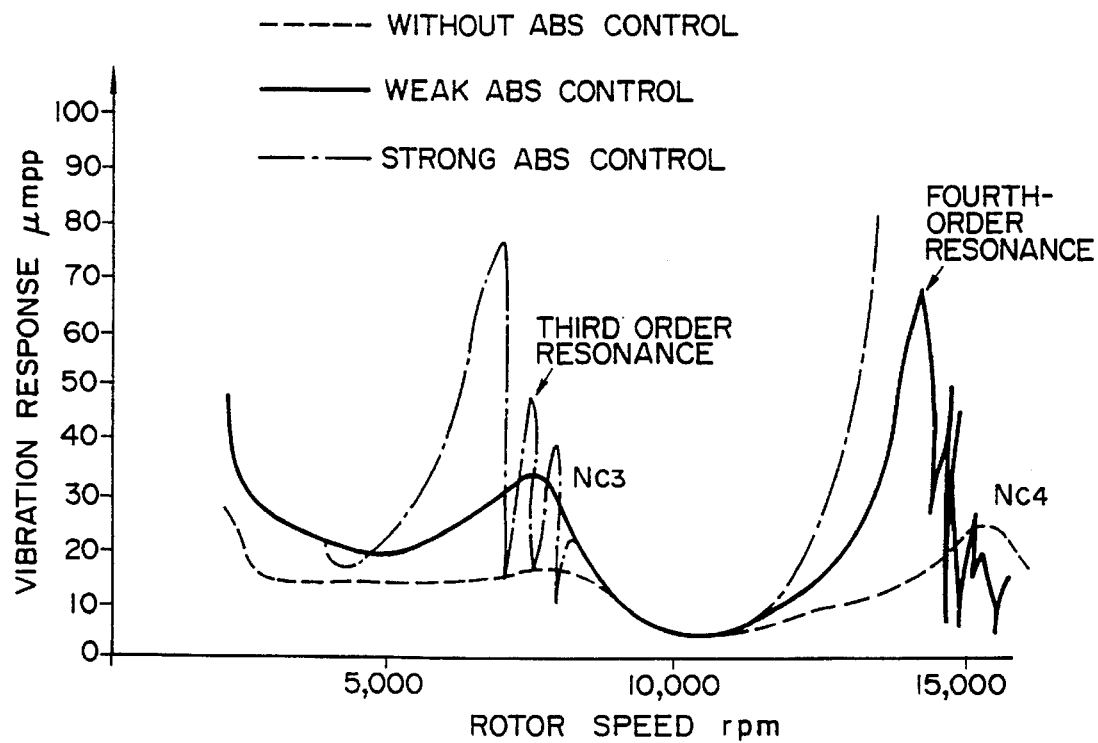

METHOD AND APPARATUS FOR CONTROLLING A MAGNETIC BEARING

BACKGROUND OF THE INVENTION

This invention relates to a method and apparatus for controlling a magnetic bearing with the intention of ensuring the stable operation of a rotor, suppressing the vibration caused by the imbalance of the rotor, and reducing the drive current.

FIG. 2 through FIG. 5 show various conventional control schemes for handling the vibration of a rotor supported by a magnetic bearing. The control scheme shown in FIG. 6 is not yet publicized at the time of filing of the application of the present invention.

Shown in FIG. 2 is the well-known servo feedback control system.

Shown in FIG. 3 is the automatic balancing system (ABS) described in Japanese patent publication JP-A-52-93852, and it may be called "N-cut system" as it derives from the operational property of eliminating the rotation-synchronous vibration component.

Shown in FIG. 4 is the critical damping control system described in Japanese patent publication JP-A-52- 93853.

Shown in FIG. 5 is the N-cross system which is an improved version of the critical damping control system shown in FIG. 4, and it was proposed by the inventors of the present invention and described in Japanese patent publication JP-A-61-262225.

Before entering into the explanation of these prior art systems, the concept of magnetic bearing control against the rotor vibration will first be explained. A rotor supported by a magnetic bearing is subjected to the floating control in the x and y directions orthogonal to each other. Vibrations of the rotor in the x and y directions are detected as vibration signals x and y, respectively. From the vibration signal x, an input signal Px to a pair of power amplifiers 5X which drive electromagnets 2X for the x direction is produced.

The magnetic bearing produces a force, which acts on the rotor in the x direction, in proportion to the Px signal. Similarly, an input signal Py to power amplifiers 5Y for the y direction is produced from the vibration signal y. Control circuits (PID controllers) 4X and 4Y, produce Px from x and Py from y respectively, which provide indivisually for the x and y directions.

A tracking filter 7 receives a rotation signal which is a pulse signal generated at each revolution of the rotor and the vibration signals x and y, and extracts rotation-synchronous components $x_N$ and $y_N$ (will be termed simply "synchronous components", or generically called "N component") from the vibration signals x and y. A two-phase oscillator 10 is a device for producing, from the rotation signal, a $\cos(\Omega t)$ signal and $\sin(\Omega t)$ signal which are synchronous with the rotation.

A prime concern of the present invention is how to treat the rotation-synchronous components $x_N$ and $Y_N$ and the $\cos(\Omega t)$ and $\sin(\Omega t)$ signals.

Next, the prior art arrangements of FIG. 2 through FIG. 5 will be explained indivisually.

Prior art system of FIG. 2: A revolving body (rotor) 1 supported by the magnetic bearing can move off the central position (will be termed "neutral position") of the magnetic bearing due to the imbalance of the rotor or the influence of external forces, and therefore it is necessary to bring the rotor back to the neutral position through the control of the magnetic bearing. In the figure, two sets of electromagnets 2X and 2Y are disposed at the right, left upper and lower peripheries of the rotor 1, and the exciting currents supplied to these electromagnets are controlled thereby to control the rotor position in the magnetic bearing. Control circuits 4X and 4Y and power amplifiers 5X and 5Y are used to energize the electromagnets. The control circuits 4X and 4Y are PID controllers. The control circuit 4X receives the value x of displacement detected by a displacement sensor 3X for the x-axis direction, and the control circuit 4Y receives the value y of displacement detected by a displacement sensor 3Y for the y-axis direction. The displacement values x and y represent the displacements of the rotor position from the neutral position.

The control circuits 4X and 4Y produce control voltages $P_X$ and $P_Y$ from the displacement values, and supply them to the sets of power amplifiers 5X and 5Y. A pair of power amplifiers 5X supply exciting currents $i_x$ to the right and left electromagnets 2X of the magnetic bearing and another pair of power amplifiers 5Y supply exciting currents $i_y$ to upper and lower electromagnets 2Y so that the horizontal and vertical displacements of the rotor from the neutral position is corrected.

The control circuits 5X and 5Y base the operation on the processing of proportion (P), integration (I) and differentiation (D), and behave with various control characteristics depending on the manner of combination of the PID components.

The servo feedback control system of FIG. 2 is a fundamental control scheme for maintaining the rotor at the neutral position. However, it is not possible for the system to maintain the rotor at the neutral position over the entire range of rotor speed due to the presence of resonance points of bend mode in the high speed regions.

When the rotor speed is raised gradually, the resonance phenomena of the first and second orders of rigid mode appear. When the rotor speed is further raised gradually, the rotor becomes to exhibit the transition from a rigid body to a resilient moving body attributable to the imbalance of the rotor. The property of resilient body yields the resonance phenomena of the first and second orders of bend mode. The rotor speeds at which these resonance phenomena appear will be called "resonant frequencies" or "resonant points". The resonant points of the first and second orders of rigid mode and the resonant points of the first and second orders of bend mode may be called in series the resonant points of the first, second, third and fourth orders, respectively. The resonance curve has peak amplitudes $Nc_1$, $Nc_2$, $Nc_3$ and $Nc_4$ corresponding to these resonant points as shown in FIG. 7.

The servo feedback control system of FIG. 2 has its PID control parameters tuned so that the rotor is maintained at the neutral position in the whole range of speed including these resonant points. Actually, however, the control system of FIG. 2 can at most maintain the rotor at the neutral position against the vibration at the resonant points of the first and second orders of rigid mode. It is difficult for this servo feedback control system alone to cover the speed regions of the resonant points of the first and second orders of bend mode in maintaining the rotor at the neutral position.

Prior art system of FIG. 3: This system derived from the one shown in FIG. 2 is provided with a tracking filter 7, and the detected rotation signals $x_N$ and $y_N$ are fed back (negative feedback) to the inputs of the control circuits 4X and 4Y. The tracking filter 7 receives the displacement signals x and y and rotation pulses, and extracts the rotation-synchronous components $x_N$ and $Y_N$. Further provided are subtracting nodes 9X and 9Y, on which the rotation-synchronous components $x_N$ and $y_N$ multiplied by a proportion factor $\beta$ (0 or 1), i.e., $Bx_N$ and $By_N$, are subtracted from the displacement values x and y, and the results are delivered to the respective control circuits 4X and 4Y.

The circuit arrangement of FIG. 3, in which $Bx_N$ and $By_N$ are subtracted from x and y, causes the magnetic bearing to be unresponsive to the vibration attributable to the unbalanced rotation (insulation of vibration). Accordingly, the spring constant $K_N$ and damping constant $C_N$ are both zero for the rotation-synchronous components. The factor $\beta$ is set to 1 when the optional ABS control is to be applied, or otherwise it is set to 0. The ABS control has an advantage of eliminating the need of the exciting currents for the suppression of the imbalance-caused vibration. The ABS control is turned off ($\beta$=0) during the passage of the resonant points, and it is turned on ($\beta$=1) after the rotor speed has passed the resonant points.

Prior art system of FIG. 4: This system derived from the one shown in FIG. 2 is provided with a set of differentiation circuits 6X and 6Y and a tracking filter 7 with the intention of reducing the resonant amplitude of bend mode. The detected displacement values x and y delivered to the PID control circuits 4X and 4Y are also received by the differentiation circuits 6X and 6Y. The circuit 6X evaluates Kx+C(dx/dt) indicative of a value proportional to the chagne with time of the displacement x, and the rotation-synchronous tracking filter 7 detects a component, which is dependent on the rotor speed N, expressed as follows.

$$x_0 = Kx_N + C(dx_N/dt) \quad \text{[Expression 1]}$$

where K is the spring constant, and C is the damping constant.

Similarly, the differentiation circuit 6Y and rotation-synchronous tracking filter 7 detect a component, which is dependent on the rotor speed N, expressed as follows.

$$y_0 = Ky_N + C(dy_N/dt) \quad \text{[Expression 2]}$$

Based on the detection of the displacements and extraction of rotation-synchronous components $x_0$ and $y_0$, the magnetic bearing is controlled only against the vibration of rotation-synchronous imbalance. This system enables the adjustment of rigidity of the bearing (by varying the spring constant K) depending on the magnitude of displacement, and enables the adjustment of damping of the bearing displacement (by varying the damping constant C) depending on the rate of change with time. Consequently, the resonant amplitud of bend mode can be reduced. Generally, a differentiation circuit configured by electronic component parts creates high-frequency noises, and therefore its performance is limited to the approximation of mathematical operation at present.

Prior art system of FIG. 5: This system detects the rotor speed based on another scheme instead of using the differentiation circuits in the prior art system of FIG. 4. The system is intended for the case of the imbalance-caused confronting vibration, and it utilizes the fact that the differentiated value of vibration in the x-axis direction is proportional to the −y displacement value, and that in the y-axis direction is proportional to the x displacement value. Accordingly, the displacement values $-y_N$ and $x_N$ are used in place of the outputs of the differentiation circuits 6X and 6Y shown in FIG. 4. The rotation-synchronous components of the rate of change of both displacements can be extracted by the tracking filter 7.

The N-cross control can be accomplished perfectly by means of differentiation circuits, and it has an equivalent function of providing the damping constant $C_N$ against the imbalance-caused vibration. Accordingly, this is an optional system arrangement employed during the passage of the resonant point.

FIG. 6 discloses a relatively new system arrangement for achieving the suppression of vibration which was filed on May 20, 1992 as U.S. Ser. No. 07/885,980 by MATSUSHITA et al., titling "Balancing method for flexible rotor and a balancer applicable to the balancing method". In contrast to the foregoing prior art systems in FIGS. 1 to 5 which can fairly be categorized as feedback control systems because of the exciting current control by means of tracking filters in response to the displacement signals, the new system of FIG. 6 does not include a tracking filter which deals with the displacement signals x and y, and is categorized to be a feed forward (FF) control system, in which a counter vibrating force is generated in the opposite phase relation with the imbalance-caused vibration of each direction thereby to offset the vibration.

A two-phase oscillator 10 included in the system of FIG. 6 produces a sine wave signal $A\sin(\Omega t+\phi)$ and a cosine wave signal $A\cos(\Omega t+\phi)$ for the rotor speed $\Omega$ in synchronism with rotation pulses. The cosine wave signal $A\cos(\Omega t+\phi)$ multiplied by a proportional factor $\gamma$ is added to the output of the control circuit 4X and the sine wave signal $A\sin(\Omega t+\phi)$ multiplied by a proportional factor $\gamma$ is added to the output of the control circuit 4Y, and the resulting signals are used for the exciting current control of the magnetic bearing. By choosing the amplitude A and phase $\phi$ properly, counter vibration forces are generated to offset the imbalance-caused vibration forces at the resonant point, and consequently the resonant amplitude can be suppressed. This operation will be called "FF counter vibration".

The two-phase outputs may be applied at the inputs of the control circuits 4X and 4Y as shown by the dashed lines in FIG. 6. The FF control is another optional control function.

FIG. 8 is a table which summarizes the applied speed range and the property of control current (exciting current) carried out by the prior art systems in FIGS. 1 to 5 and above F.F. counter vibration.

The critical damping system described in Japanese patent publication JP-A-52-93853 produces the displacement rate signals dx/dt and dy/dt from the displacement signals x and y, and therefore it necessitates differentiation circuits, resulting in a complex circuit arrangement. This system involves another problem of a large vibration amplitude caused by the imbalance at the passage of the critical speed, which requires an increased amount of exciting current. The N-cross control described in Japanese patent publication JP-A-61-262225 involves the same problem of a large exciting current due to the introduction of the resonant vibration signals to the PID control circuit. These increased exciting currents demand a large dynamic range of power amplifiers, imposing the difficulty of practice. The ABS operation filters out the rotation-synchronous vibration components caused by the imbalance, and the exciting current can be reduced significantly. However, the activation of ABS control during the passage of the resonant creates an increased vibration, and therefore this control must be used only after the passage of the critical speed. Accordingly, the PID control without the accompaniment of ABS control during the passage of the critical speed expends a large amount of exciting current. The application of the ABS control further involves a problem of system instability such as drifting besides the insuffient reduction of imbalance-caused vibration.

FIG. 9 are examples of vibration characteristic curves showing the effectiveness of the ABS control. When attention is paid to the speed region near the third-order resonant point, the rotor is stable when the ABS control is absent or it is applied weakly. However, if the ABS control is strengthened, the vibration curve oscillates violently following the passage of the third-order resonant point. Accordingly, strong ABS control must be avoided in the speed regions near the resonant points, and it works effectively in a speed region distant from the resonant point, i.e., the speed region between the third-order and fourth-order resonant points in this example.

On this account, the ABS control based on the technical level at present is limited to the application in speed ranges which exclude the resonant regions.

SUMMARY OF THE INVENTION

Accordingly, an object of this invention is to provide a method and apparatus for controlling a magnetic bearing capable of attaining the stable passage of the resonant points while leaving the ABS control active.

The technical level at present does not yet fulfill the requirement of suppressing the rotor vibration sufficiently at the passage of the resonant points at a small current consumption, as will be appreciated from FIG. 8. It is crucial for the magnetic bearing control to suppress the rotor vibration at the consumption of as small exciting current as possible when the control is needed at the passage of the resonant points, and to minimize the current consumption thoroughly in the rotor speed regions which do not necessitate the vibration suppression control.

Namely, the present invention is intended to keep the vibration small at a small current consumption, which provides additional advantages from the viewpoints of energy conservation and the extended life time of the device.

Accordingly, another object of this invention is to provide a method and apparatus for controlling a magnetic bearing capable of reducing the resonant amplitude of the rotation-synchronous, imbalance-caused vibration and improving the durabiity of the magnetic bearing through the reduction of the exciting current supplied to the electromagnets of the magnetic bearing.

Still another object of this invention is to provide a method and apparatus for controlling a magnetic bearing capable of reducing the energy consumption thoroughly.

Still another object of this invention is to provide a method and apparatus for controlling a magnetic bearing capable of selecting any of predetermined control schemes appropriately depending on the rotor speed.

In order to achieve the above objectives, this invention is designed to carry out the ABS control and N-cross control in coaction. Setting for the controls can be done from the outside.

Moreover, this invention is designed to carry out the ABS control, N-cross control and FF control in coaction. Setting for the controls can be done from the outside.

Moreover, this invention is designed to carry out the ABS control and N-straight control in coaction. Setting of the controls can be done from the outside.

Moreover, this invention is designed to carry out the ABS control, N-straight control and FF control in coaction. Setting of the controls can be done from the outside.

Moreover, this invention is designed to carry out the ABS control, N-cross control and N-straight control in coaction. Setting of the controls can be done from the outside.

Moreover, this invention is designed to carry out the ABS control and FF control in coaction. Setting of the controls can be done from the outside.

Moreover, this invention is designed to carry out the N-straight control.

Moreover, this invention is designed to carry out the ABS control, N-cross control, FF control and N-straight control in coaction. Setting of the controls can be done from the outside.

Moreover, this invention is designed to carry out the ABS control, N-straight control and FF control in coaction.

Moreover, this invention is designed to cover the speed range which includes the resonant points of the first to fourth orders, with each control parameter taking a value between 0 and 1.

Moreover, this invention is designed to perform the scheduled control based on a memory table, and carry out the control through the software-based processing.

The inventive magnetic bearing control method and apparatus enable the reduction of resonant amplitude, stable passage of the resonant points, and reduction of the exciting currents supplied to the electromagnets of the bearing through the arbitrary selection of the N-cross control, N-straight control or FF control, with the ABS control being kept active.

In addition, according to this invention, each control parameter can be set arbitrarily depending on the rotor speed, thereby accomplishing optimal control for each rotor speed region.

BRIEF DESCRIPTION OF THE DRAWINGS

FIG. 8 is a diagram showing the relation between the applicable rotor speed range and the control current based on the conventional system and those of the preceding patent applications;

FIG. 9 is a vibration response curve based on the ABS control;

Figure 10:
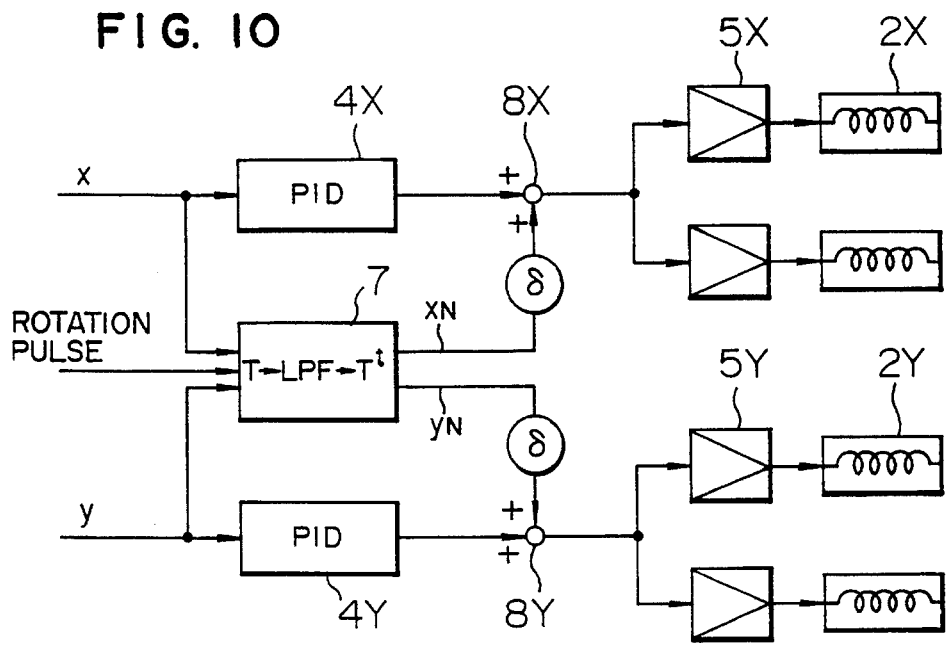
FIG. 10 shows an embodiment of this invention for carrying out the N-straight control.

DESCRIPTION OF THE PREFERRED EMBODIMENTS (1) N-Straight Control (FIG. 10)

FIG. 10 shows the system configuration based on an embodiment of this invention. In this embodiment, the rotation-synchronous components $x_N$ and $y_N$ multiplied by a proportion factor $\delta$ are added to the outputs of the control circuits 4X and 4Y. The embodiment is intended to strengthen the spring constant $K_N$, and it shifts the resonant point toward the higher speed region thereby to reduce the vibration. This optional control is named "N-straight control" in contrast to the N-cross control, and is used in the speed range below the resonant point.

The proportion factor $\delta$ is set greater than or equal to zero, preferably. By setting $\delta=0$, values to be added, i.e., $\delta x_N$ and $\delta y_N$, are both zero, implementing the case without the N-straight control. With a positive large proportion factor $\delta$ being set, the $x_N$ and $y_N$ values multiplied by $\delta$ are added, implementing the typical N-straight control. With a negative proportion factor $\delta$ being selected, the proportion of the effect of N-straight control varies. The last case of a negative proportion factor $\delta$ is used with the intention of shifting the resonant point toward the lower speed region for the reduction of vibration by preventing the occurrence of resonation.

Figure 11A:
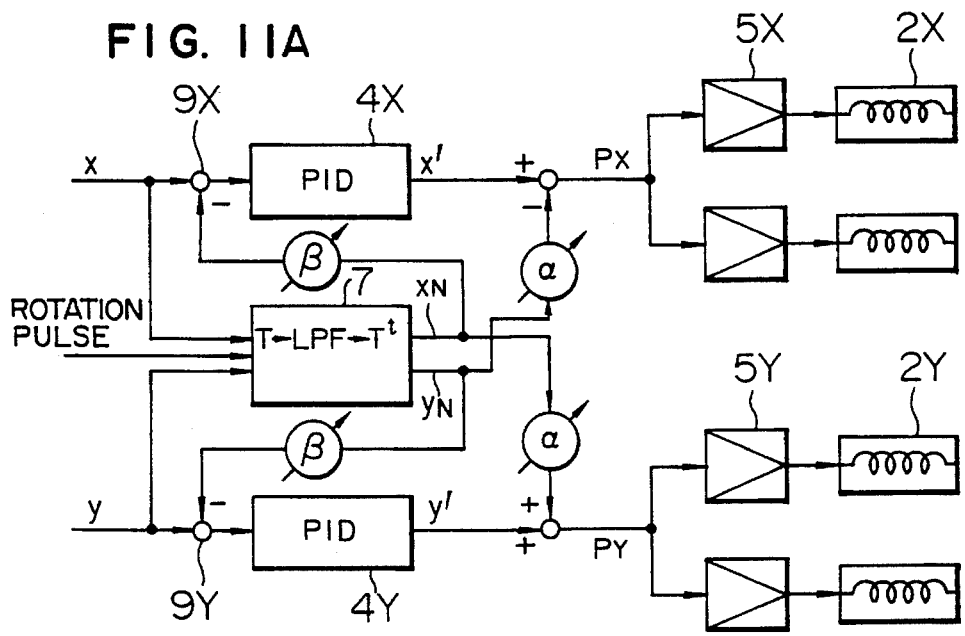
FIGS. 11A and 11B show an embodiment of this invention for carrying out the ABS control and N-cross control in coaction.
Figure 11B:
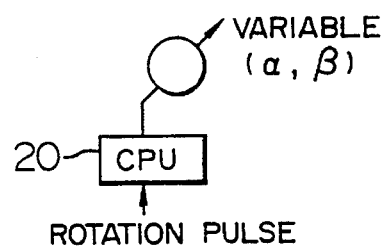

(2) ABS Plus N-Cross Control (FIG. 11)

FIG. 11 shows the system configuration based on another embodiment of this invention, and it is intended to achieve the stable passage of the resonant point while leaving the ABS control active. The outputs $x_N$ and $y_N$ of the tracking filter 7 multiplied by a proportion factor $\beta$ are fed back (negative feedback) to the nodes 9X and 9Y, and, at the same time, the $x_N$ and $y_N$ multiplied by another proportion factor $\alpha$ are merged to the outputs of the control circuits 4Y and 4X, respectively, by being exchanged for the x-y correspondence. The embodiment is intended to set a zero value to $K_N$ and $C_N$ in the PID control circuit based on the ABS control, and suppress the resonant amplitude only by the damping of the magnetic bearing by setting a non-zero value to the damping constant $C_N$ by the N-cross control. The embodiment shown in FIG. 11 is used for the reduction of the resonant amplitude during the passage of the resonant point. By setting $\beta$ to 1 and $\alpha$ to be a positive large value, the ABS control and N-cross control function in unison perfectly, whereas by selecting the $\alpha$ and $\beta$ appropriately in the ranges of $0 \leq \beta 1$ and $0 \leq \alpha$, the proportion of the effects of both control functions can be adjusted arbitrarily. The values of the $\alpha$ and $\beta$ are selected by a CPU 20 which receives rotation pulses.

Figure 12:
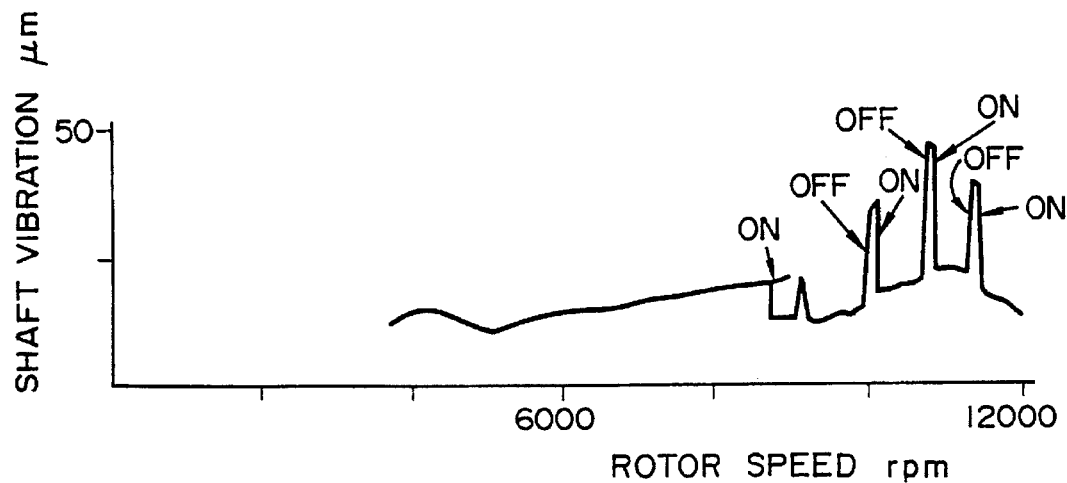
FIG. 12 is a vibration response curve resulting from the ABS control and N-cross control.

FIG. 12 shows a graphic data based on the experiment of carrying out the ABS control and the N-cross control of the rotation-synchronous tracking filter according to this embodiment at the same time. The vibration amplitude is plotted along the vertical axis against the rotor speed on the horizontal axis. On the graph, indicated by ON is the point at which the control shown in FIG. 11 ($\alpha$ is a large positive value) is turned on, and indicated by OFF is the point at which the N-cross control is turned off ($\alpha$ is zero). The graph reveals that the vibration amplitude falls drastically when the N-cross control is turned on and it returns to the original amplitude when the control is turned off. According to this embodiment, the resonant amplitude of bend mode is also damped moderately and the passage of the critical speed with a small vibration amplitude is made possible.

Figure 13:
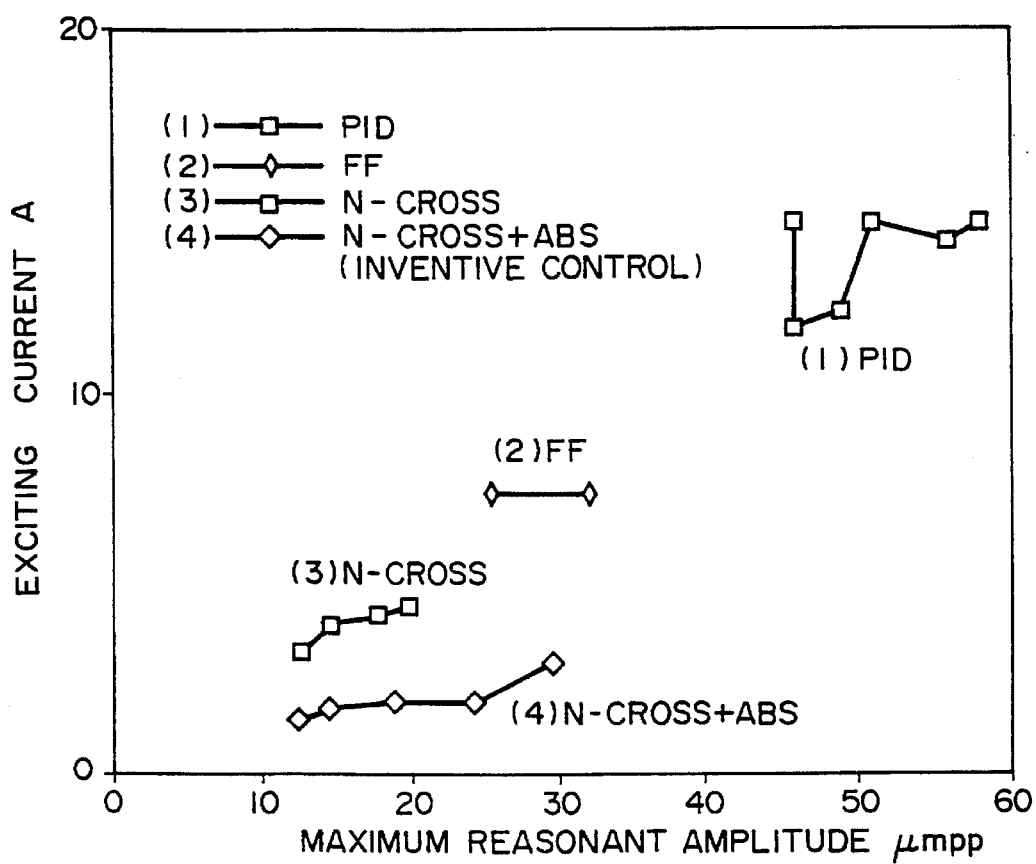
FIG. 13 is a graphic data based on the experiment showing the relation between the resonant amplitude and the exciting current achieved by various types of control

FIG. 13 compares the control performance of this embodiment with those of the conventional control systems on a graph where the control current is plotted along the vertical axis against the maximum resonant amplitude on the horizontal axis. The graph reveals that the N-cross control reduces significantly both the vibration amplitude and control current as compared with the basic PID servo control, and the control of this embodiment (indicated by "inventive control" in the figure) consumes much less control current than the N-cross control. The control current based on this embodiment is significantly small as compared with the FF control. The control result of this embodiment was obtained for the control parameter $\beta$ set to 1 and $\alpha$ set to a positive large value. This control current is almost the lower limit theoretically.

The control parameter setting manner explained above is intended to minimize the resonant amplitude, and it is effective for the passage of the critical speed. Accordingly, this combinational control is no more needed once the rotor speed has passed the critical speed, in which region the simple ABS control is desirable. On this account, the control parameter β is set nearly equal to 1 and α is set to 0, preferably. The configuration of FIG. 11, with α and β being set selectively depending on the speed range, enables the most efficient control with a minimal control current over the entire speed range.

Figure 14A:
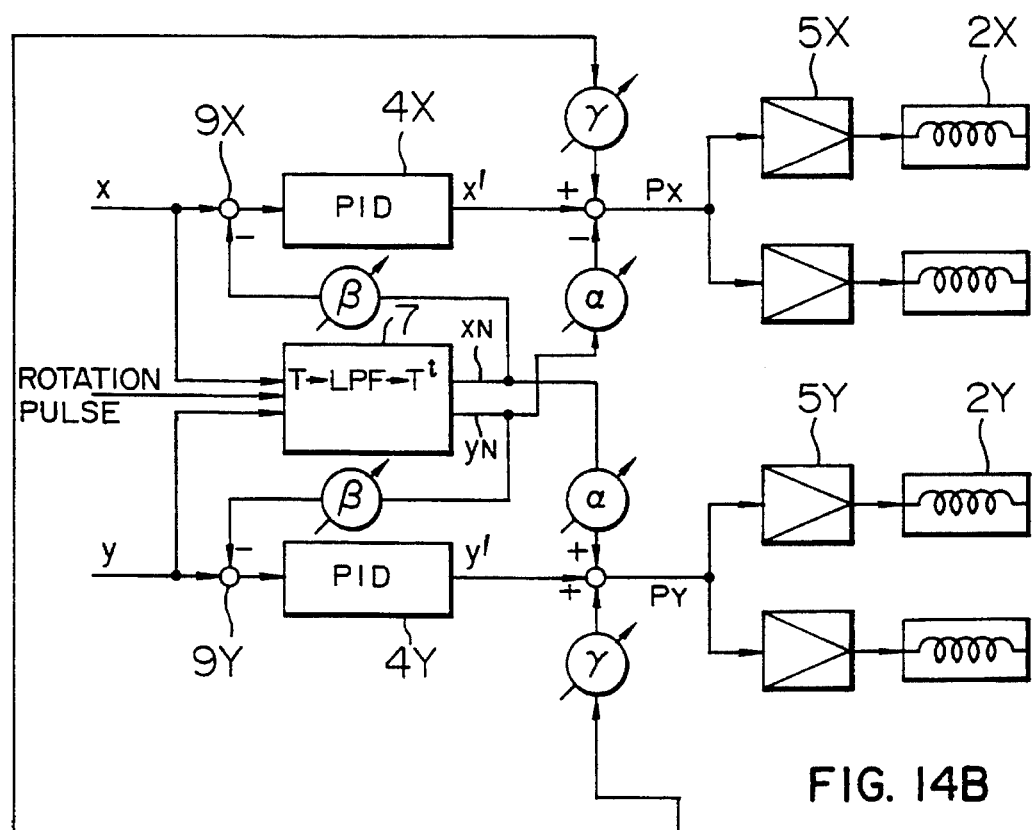
FIGS. 14A and 14B show an embodiment of this invention for carrying out the ABS control, N-cross control and FF control in coaction.
Figure 14B:
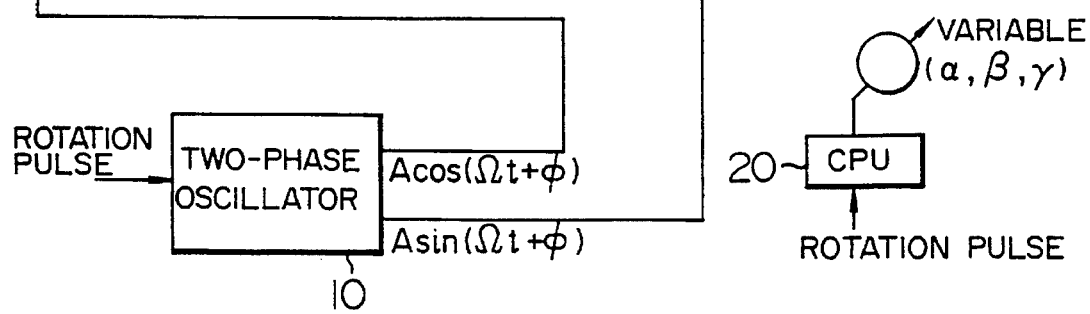

(3) ABS Plus N-Cross Plus FF Control (FIG. 14)

FIG. 14 shows the system configuration of this embodiment. The arrangement, which is derived from the embodiment of FIG. 11, includes a two-phase synchronous oscillator 10. The outputs of the oscillator 10 multiplied by a proportion factor γ are added to the outputs of the control circuits 4X and 4Y. This system configuration, in which the ABS control, N-cross control and FF control work in unison, is capable of further reducing the resonant amplitude during the passage of the resonant point.

Figure 15:
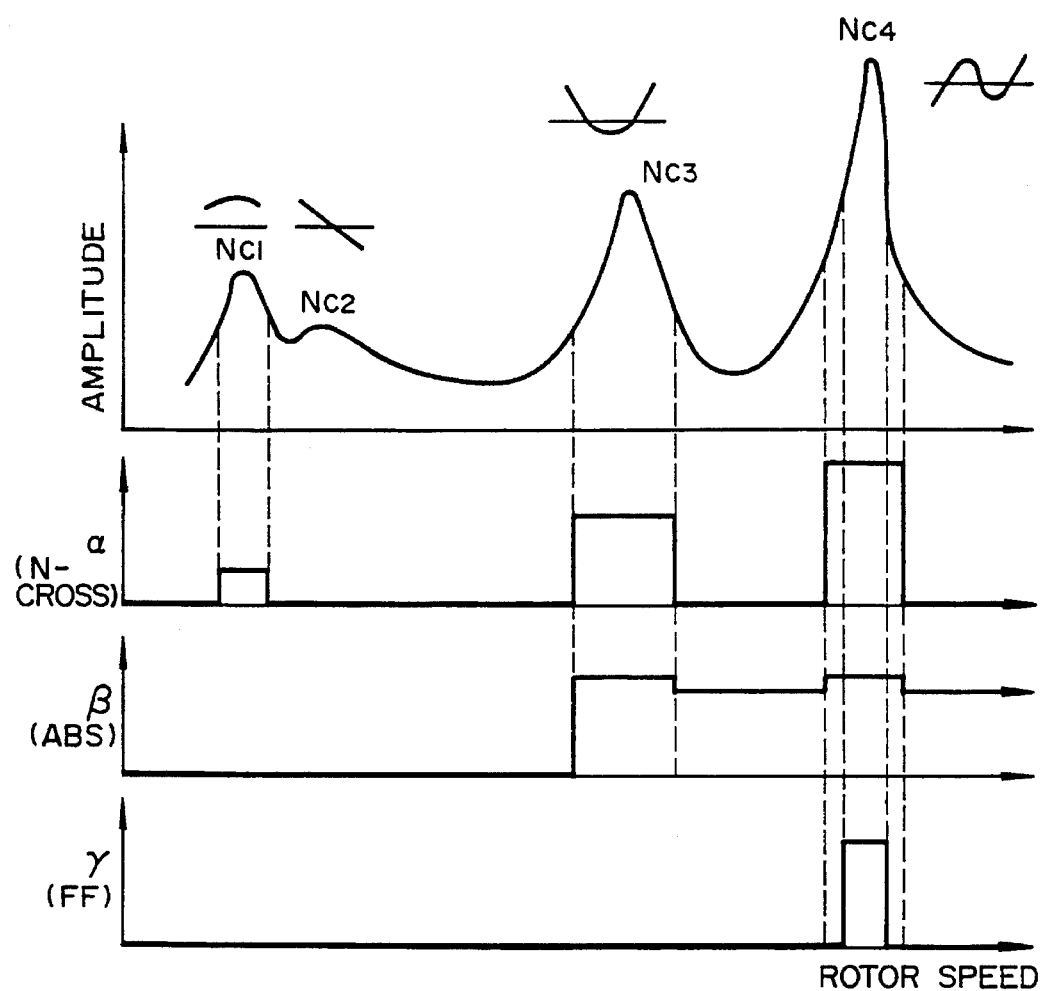
FIG. 15 is a diagram showing scheduled control applied to the embodiment of FIG. 14.

By preparing a schedule of proportion factors α, β and γ for each speed region and operating the system in accordance with the schedule, it is possible to minimize the control current over the entire speed range. FIG. 15 shows an example of the control schedule. In the case of operating the magnetic bearing across the fourth-order resonant point $Nc_4$, the usual PID control is generally adopted in speed regions outside the resonant point and the N-cross control (with α) is activated when necessary for the passage of the resonant points of the first and second orders in the low speed region. At the third-order resonant point which may be somewhat difficult to pass, the N-cross control (with α) and ABS control (with β) in coaction are adopted. In the speed region between the third-order and fourth-order resonant points, where the rotor speed is relatively high and the reduction of control current is meaningful, the ABS control (with β) is adopted. At the fourth-order resonant point, which is the most difficult passage, the FF counter vibration control (with γ) is applied in addition to the N-cross control (with α) plus ABS control (with β). After the rotor speed has passed the fourth-order resonant point, the operation of the ABS control (with β) alone is restored so as to reduce the current consumption.

Accordingly, by switching the proportion factors α, β and γ in accordance with the schedule in response to the rotor speed, it becomes possible to operate the magnetic bearing efficiently with a minimal control current over the entire speed range. Setting the values of the proportion factors α β and γ and making a schedule of these control parameters for individual speed regions can easily be done with the CPU 20 in advance based on the prior calculation or experiment for locating the resonant points in the speed domain. Each of the proportion factors α, β and γ can be set greater than or equal to zero. A smaller proportion factor weakens the corresponding control function, and a larger proportion factor strengthens the corresponding control function.

Figure 16A:
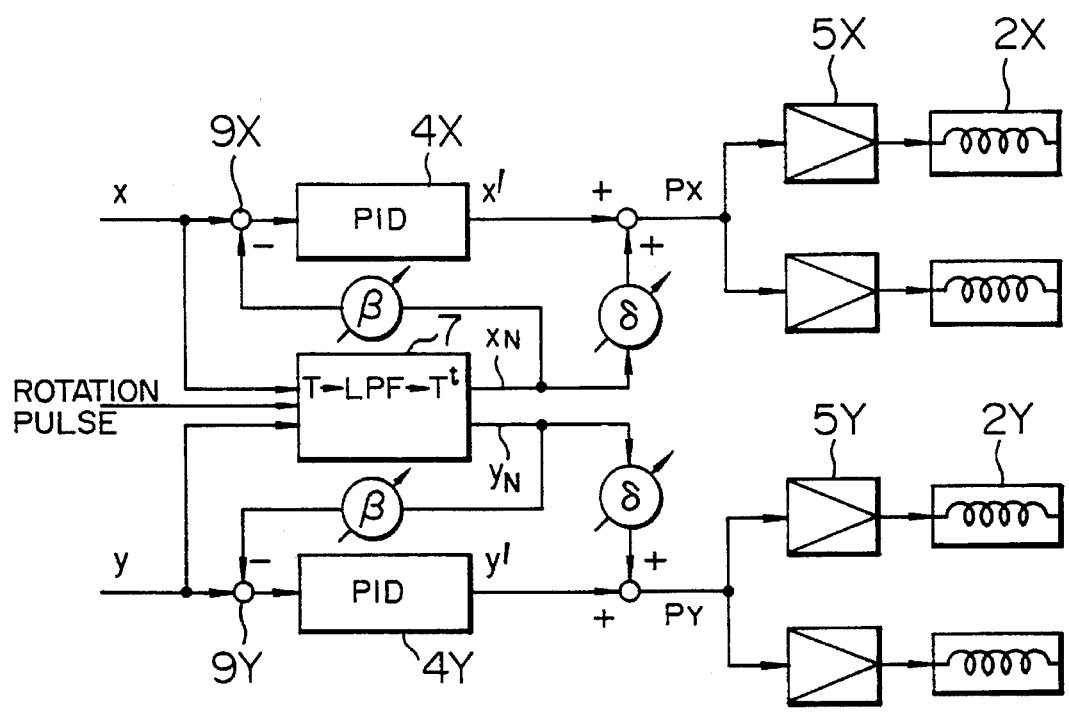
FIGS. 16A and 16B show an embodiment of this invention for carrying out the ABS control and N-straight control in coaction.
Figure 16B:
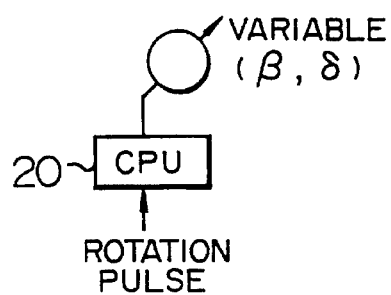

(4) ABS Plus N-Straight Control (FIG. 16)

FIG. 16 shows the system configuration of this embodiment. This embodiment is the the N-straight control shown in FIG. 10 coacting with the ABS control. An advantage of this embodiment is the ability of shifting the resonant point toward the higher speed and thus providing a wide safe region between the resonant points, while leaving the ABS control active. This system configuration shown in FIG. 16 is useful for the reduction of vibration amplitude for the rotor speed below the resonant point. The proportion factor δ can take any positive or negative value inclusive of zero. In the case of δ having a negative value, the control system shifts the resonant point toward the lower speed, thereby providing a wide safe speed region following the passage of the resonant point, and the vibration can be reduced.

Figure 17A:
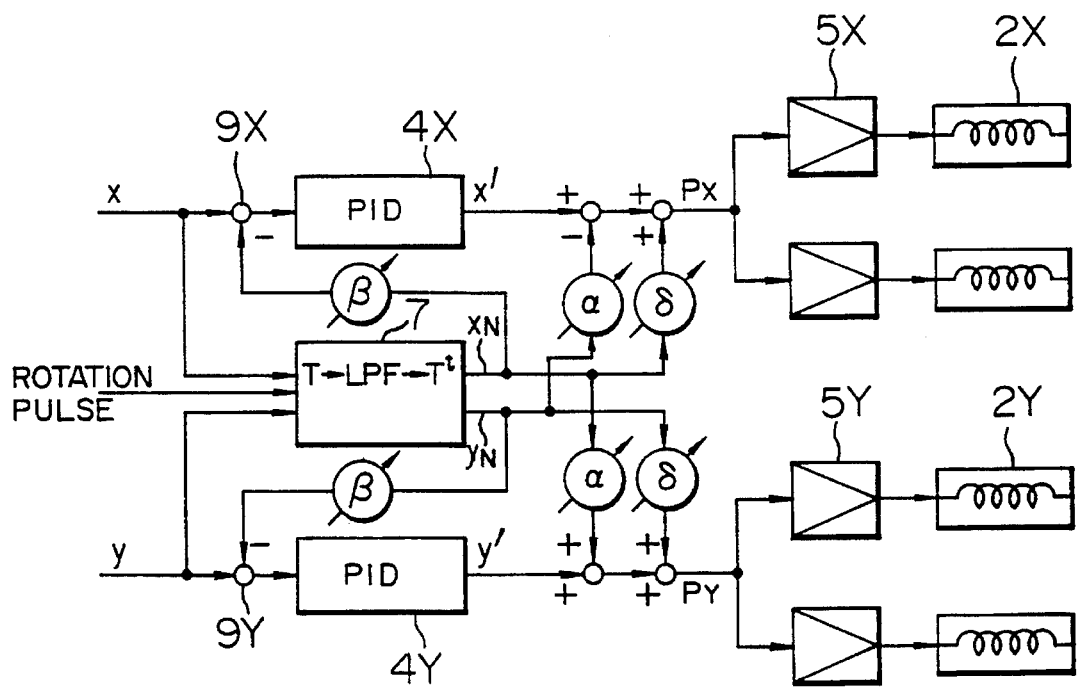
FIGS. 17A and 17B show an embodiment of this invention for carrying out the ABS control, N-cross control and N-straight control in coaction.
Figure 17B:
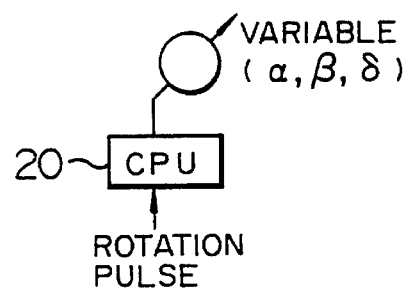

(5) ABS Plus N-Cross Plus N-Straight Control (FIG. 17)

FIG. 17 shows the system configuration of this embodiment. The embodiment applies the N-cross control and N-straight control in coaction, with the ABS control being active, and it can reduce the current consumption and the vibration amplitude.

Figure 18A:
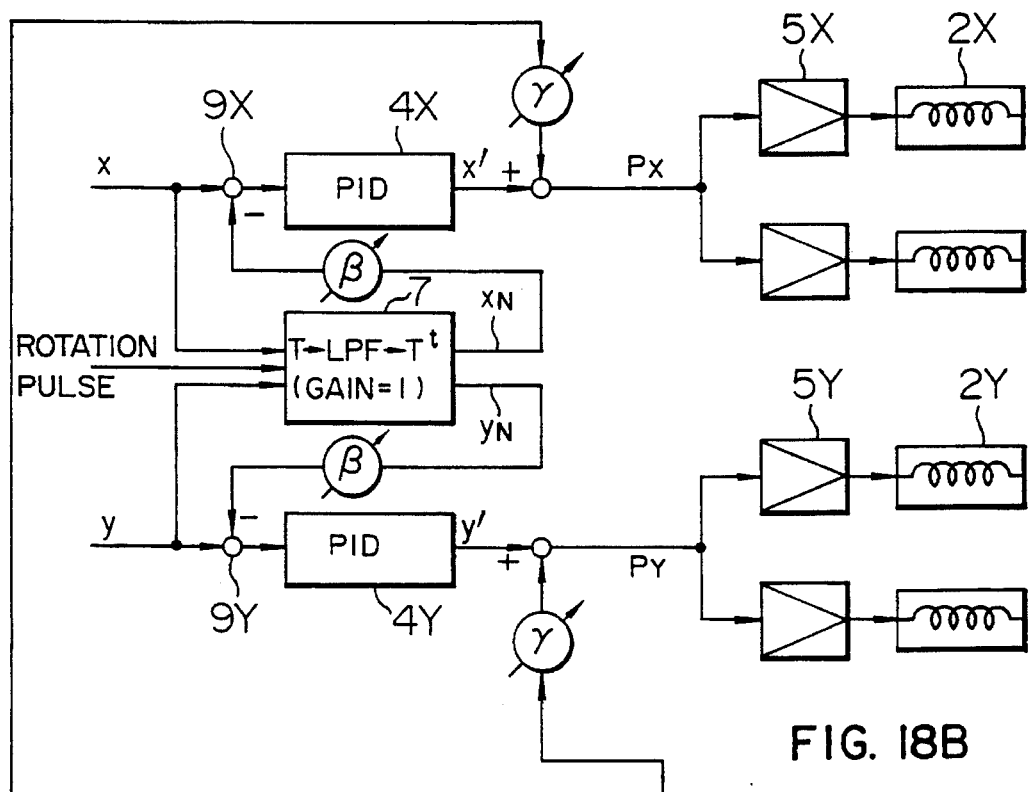
FIGS. 18A and 18B show an embodiment of this invention for carrying out the ABS control and FF control in coaction.
Figure 18B:
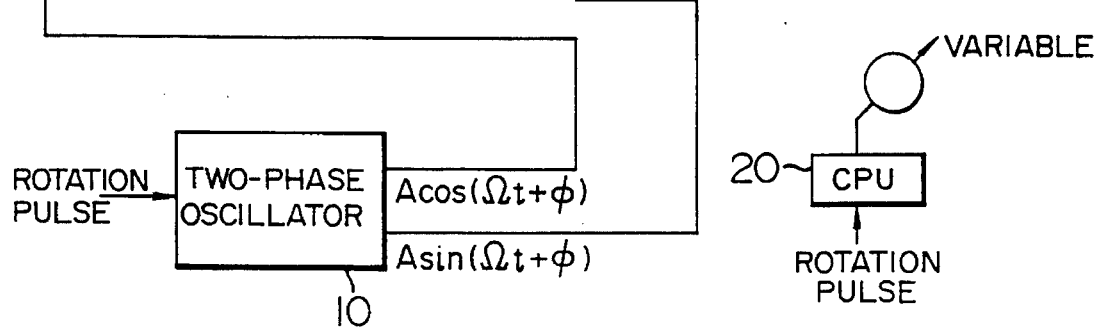

(6) ABS Plus FF Control (FIG. 18)

FIG. 18 shows the system configuration of this embodiment. The embodiment applies the FF control, with the ABS control being active.

Figure 20A:
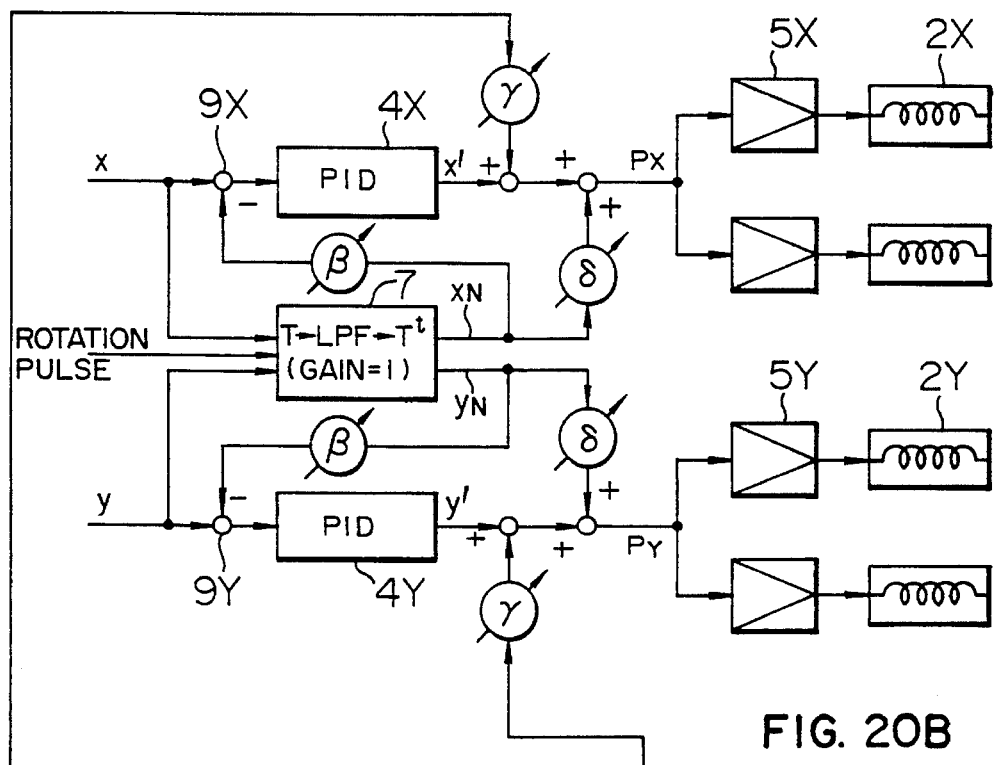
FIGS. 20A and 20B show an embodiment of this invention for carrying out the ABS control, N-straight control and FF control in coaction.
Figure 20B:
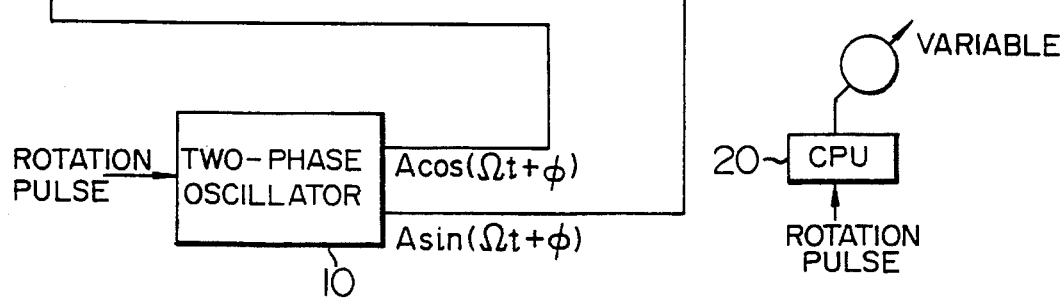

(7) ABS Plus N-Straight Plus FF Control (FIG. 20)

FIG. 20 shows the system configuration of this embodiment. The embodiment applies the N-straight control and FF control in coaction, with the ABS control being active.

Figure 19A:
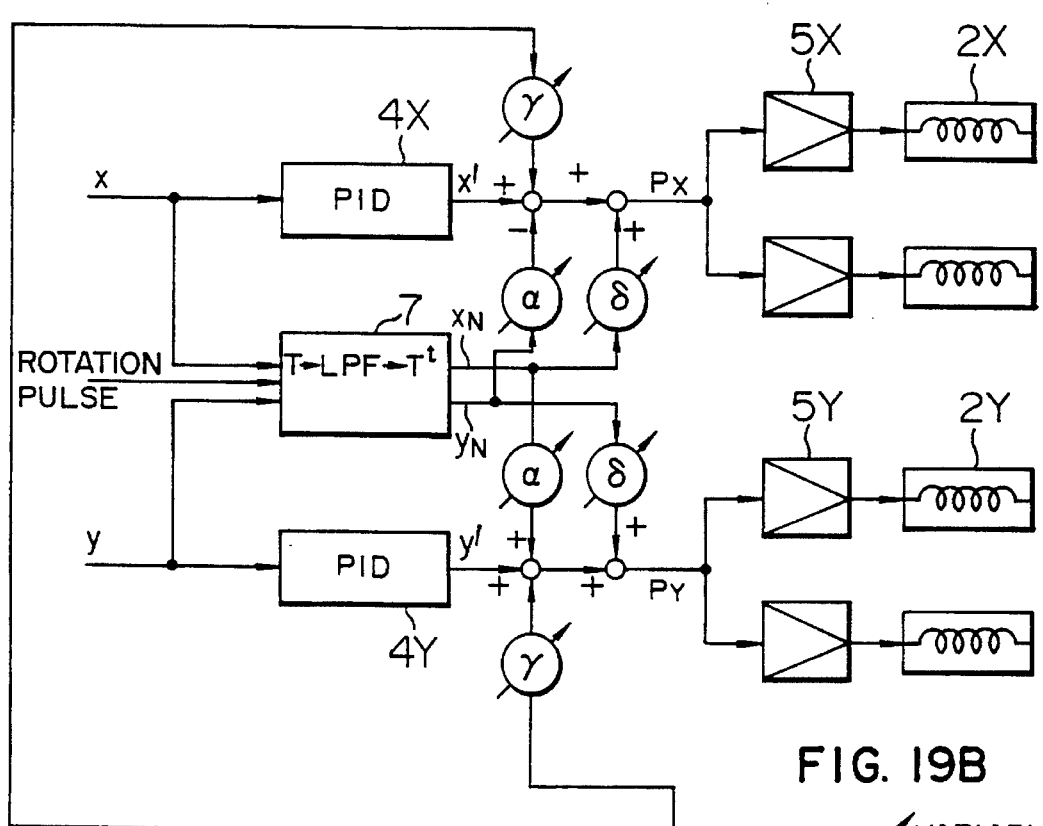
FIGS. 19A and 19B show an embodiment of this invention for carrying out the N-cross control, N-straight control and FF control in coaction.
Figure 19B:
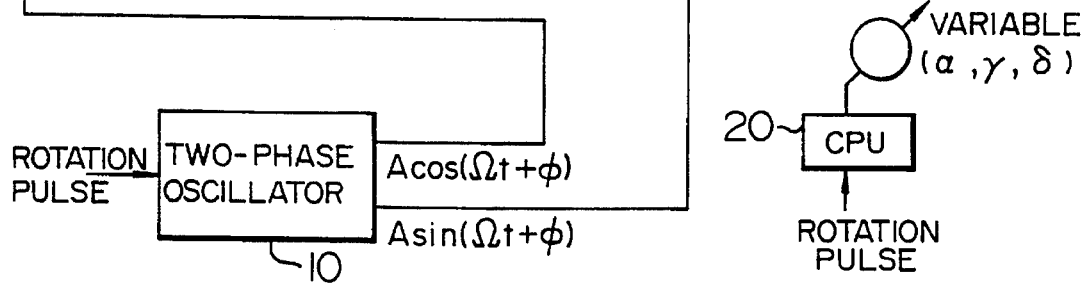

(8) N-Cross Plus N-Straight Plus FF Control (or Any Pair of These Controls) (FIG. 19)

FIG. 19 shows the system configuration of this embodiment. The embodiment applies the N-cross control, N-straight control and FF control in coaction, but excluding the ABS control. Other possible combinations are the N-cross control plus N-straight control, the N-straight control plus FF control, and the N-cross control plus FF control.

Figure 1A:
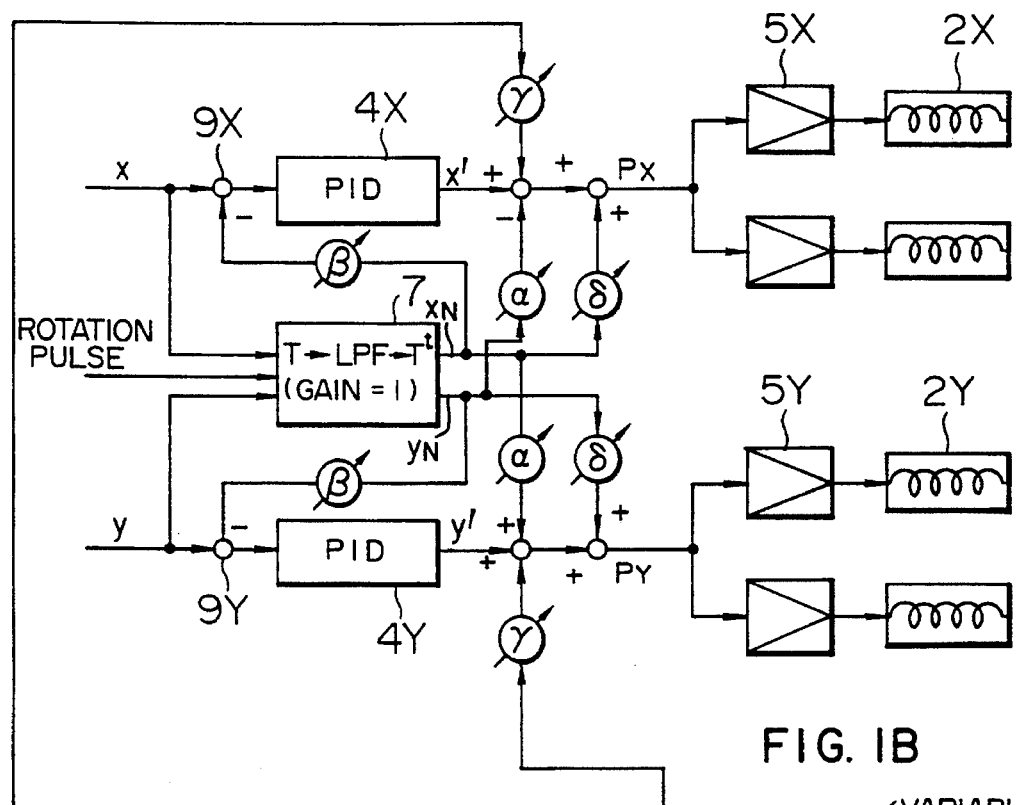
FIGS. 1A and 1B show an embodiment of this invention in which the ABS control, N-cross control plus N-straight control, and FF control are combined.
Figure 1B:
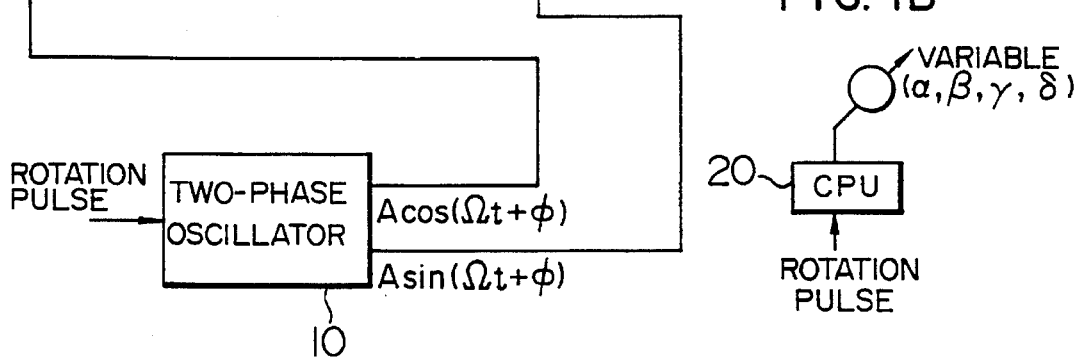
Figure 2:
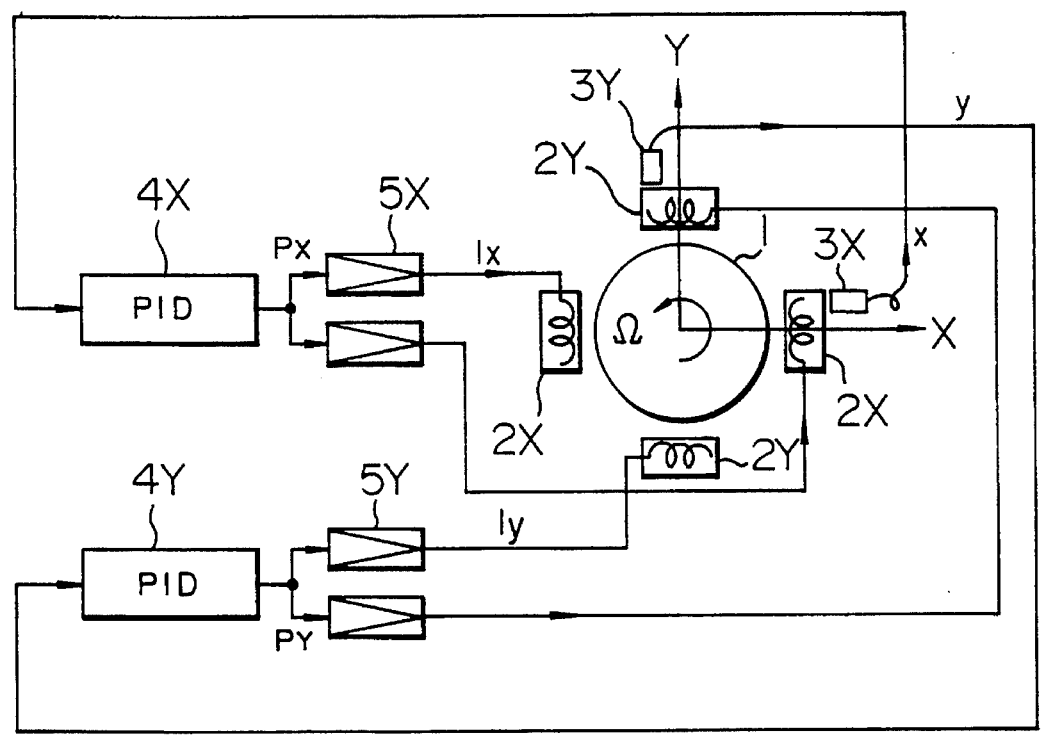
FIG. 2 shows the conventional PID control.
Figure 3:
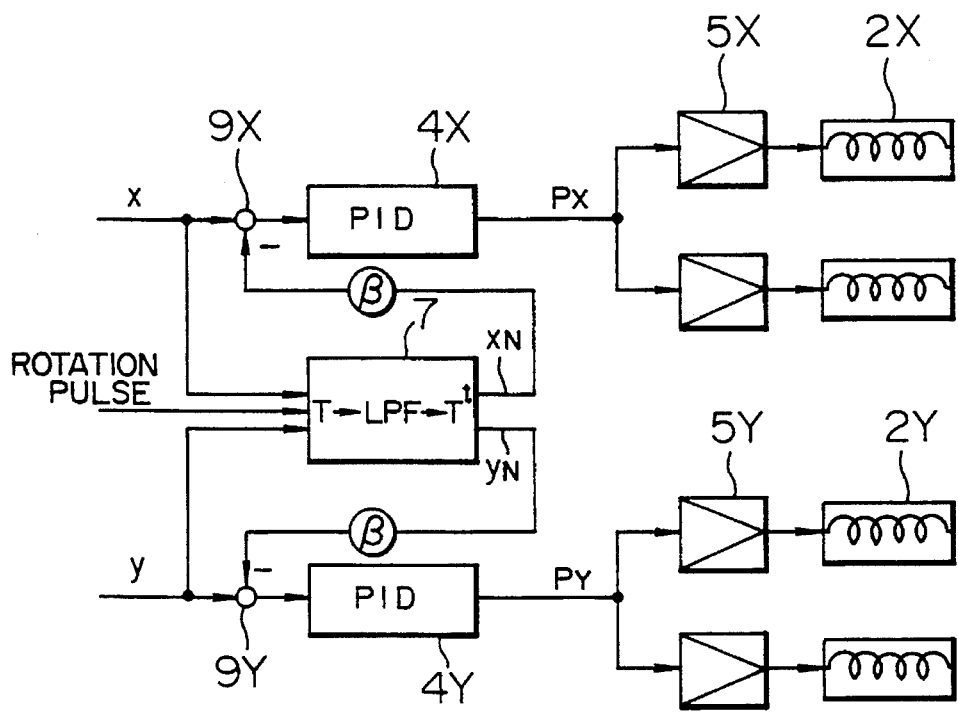
FIG. 3 shows the conventional ABS control.
Figure 4:
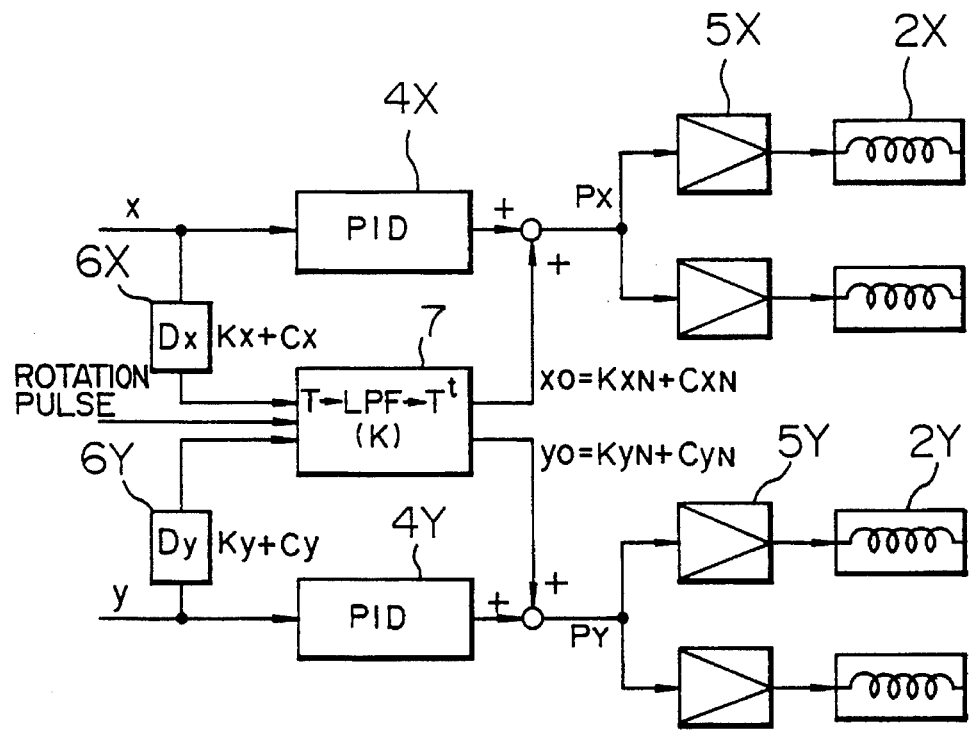
FIG. 4 shows the conventional critical control.
Figure 5:
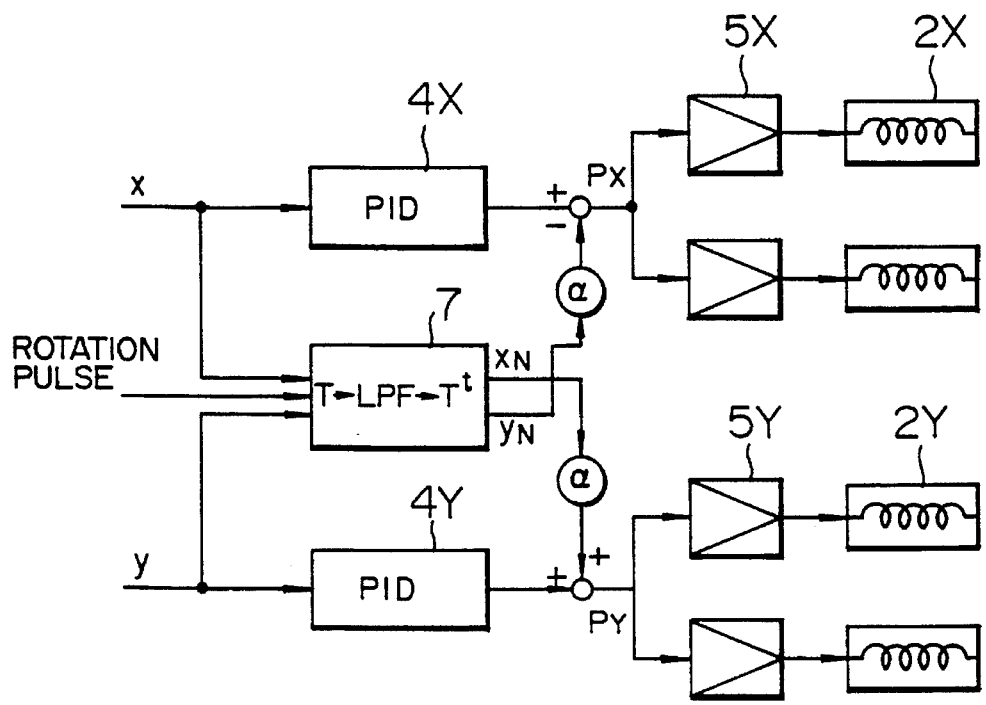
FIG. 5 shows the conventional N-cross control.
Figure 6:
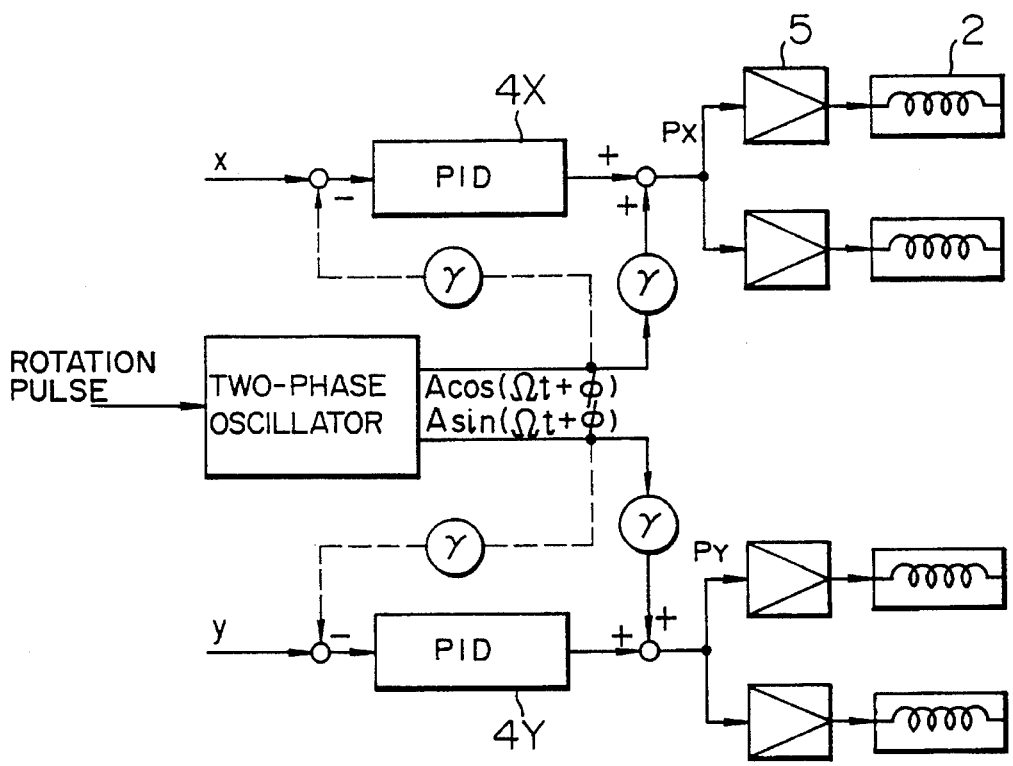
FIG. 6 shows the FF control.
Figure 7:
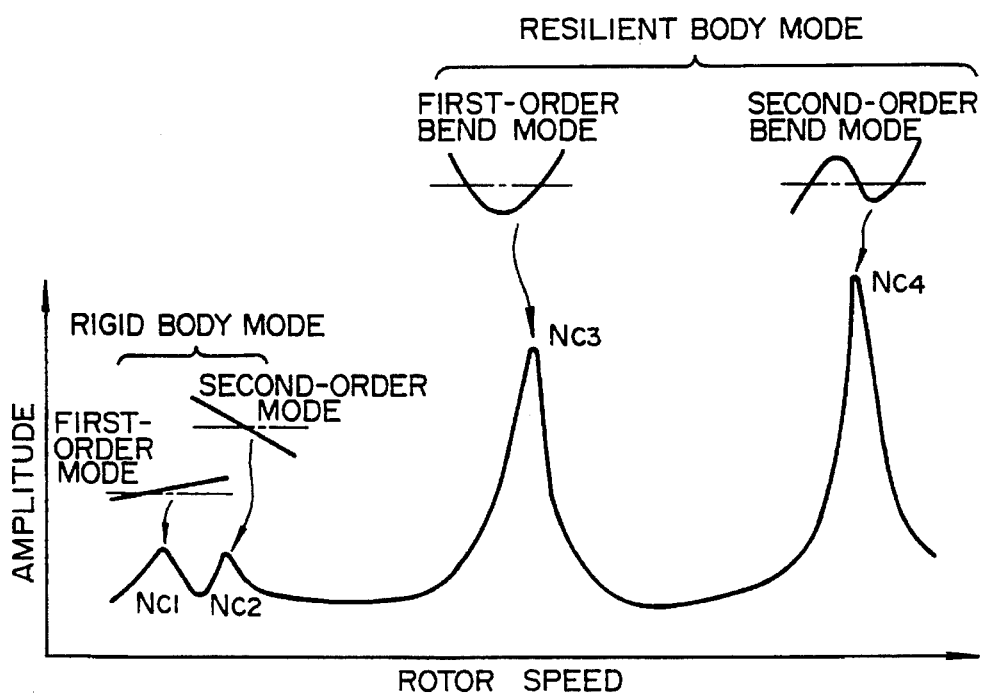
FIG. 7 is a diagram explaining the first-order to fourth-order resonant points.

(9) ABS Plus N-Cross Plus N-Straight Plus FF Control (FIG. 1)

FIG. 1 shows the system configuration of this embodiment. The embodiment is intended to reduce the vibration and the current consumption by application of the ABS control, N-cross control, N-straight control and FF control arbitrarily depending on the rotor speed.

It is crucial for the magnetic bearing control to suppress the rotor vibration at the consumption of as small exciting current as possible when the control is needed at the passage of resonant points or the like, and to minimize the current consumption thoroughly in the rotor speed ranges which do not necessitate the vibration suppression control. Namely, the present invention is intended to achieve a low vibration level at a small current consumption. The low-power operation provides many additional advantages such as the extended life time of the device. Accordingly, it is crucial to select optional control functions appropriately for individual rotor speed regions. Specifically, in regard to the imbalance-caused vibration, the control system must be provided with damping characteristics to suppress the vibration in the speed region of the passage of resonant point, and it is desirable to take no control action for the imbalance-caused vibration in speed regions other than the resonant points.

Being analogous to a top which spins itself without a support, it is conceivable that the magnetic bearing does not need control, which is dependent on the rotor speed, in speed regions other than the resonant points. In a speed region near a resonant point for which a vibration preventive action is intended, a possible control scheme is to shift the resonant point upward by creating a larger positive rotation-synchronous spring force, or to shift the resonant point downward by creating a larger negative spring force. The embodiment of FIG. 1 is designed to accomplish the magnetic bearing control which reduces the vibration and the current consumption over the entire speed range by carrying out control depending on the rotor speed in relation with the resonant point.

The following explains the application of the system configuration shown in FIG. 1 to the rotor vibration suppression control of a centrifugal compressor having a magnetic bearing. Typically, this kind of device operates in the speed region between the first-order resonant point $Nc_3$ and second-order resonant point $Nc_4$ of bend mode.

In the stationary state of the rotor, the main PID control circuits 4 for the x and y directions operate to keep the rotor floating. In the relatively low speed region of rigid mode, the the PID control circuits still have a major role, and control against the resonance of bend mode in the higher speed region is shared by the optional control functions which will be explained later. This control plan simplifies the tuning work significantly, whereas conventionally all of the rotor floating operation, vibration preventive control in the low speed region including the resonant points of rigid mode, and vibration preventive control in the high speed region including the resonant points of bend mode are imposed on the PID control circuits 4, resulting in a difficult tuning work. This embodiment is designed to allot the duty to the low speed region primarily to the PID control circuits and the duty of the high speed region to the optional control circuits which bases the control characteristics on the parameters $\beta$, $\alpha$, $\delta$ and $\gamma$.

Figure 21:
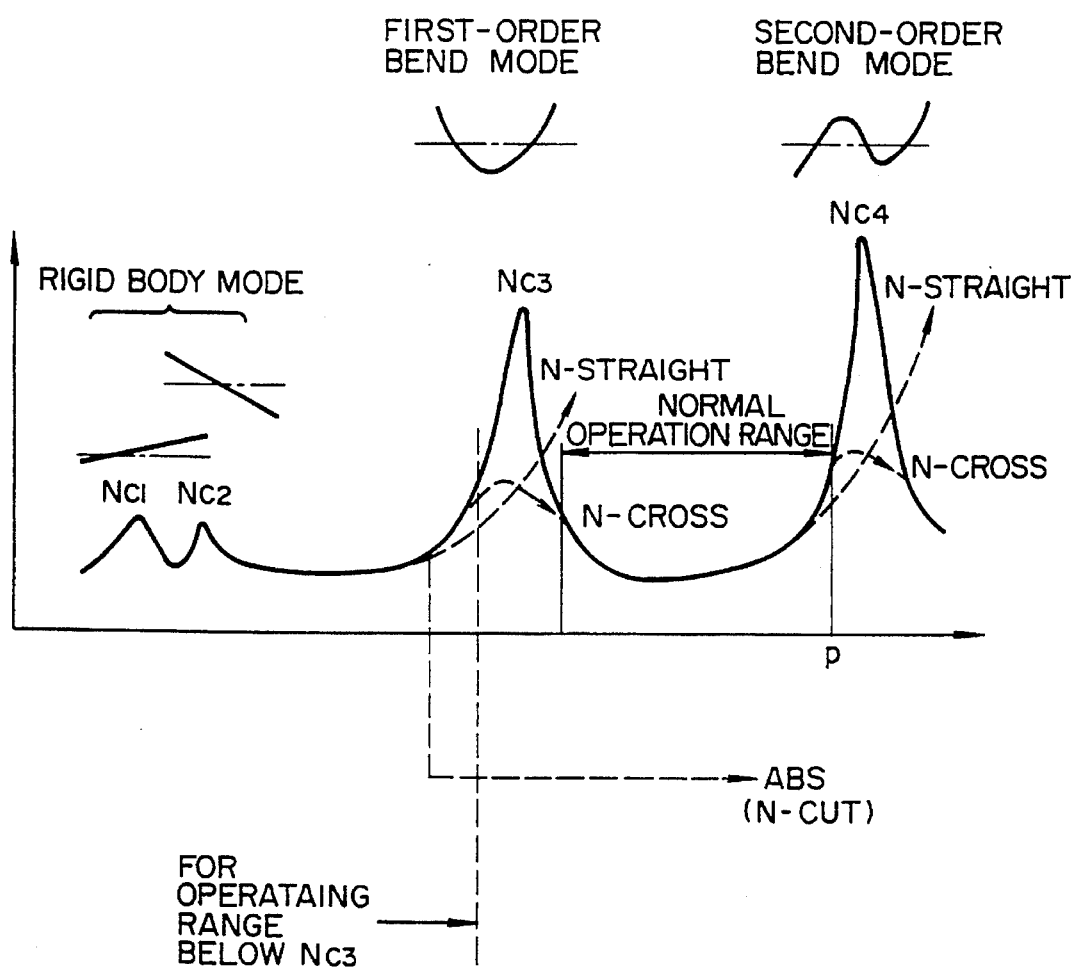
FIG. 21 is a diagram showing scheduled control applied to the embodiment of FIG. 1.

FIG. 21 shows a control plan based on this embodiment for activating the optional control circuits. At the beginning, the resonant points of rigid mode in the low speed region appear. Usually, these resonant points can be treated by the PID control circuits 4, or, if necessary, an optional control function for the reduction of resonant amplitude, such as the N-cross control, is added. The control parameters for this speed region can be tuned relatively easily.

Next, when the rotor speed is increased gradually, the first-order critical speed (resonance) of bend mode appears. The main PID control circuits alone are not enough to provide the damping force needed in this speed region, and it is preferable to add an optional control function.

In the case of the rotor speed below the first-order resonant point $Nc_3$, the N-straight control is used to shift the resonant point upward slightly, and the vibration can be kept small. If the N-straight control is not enough and the passage of the resonant point is needed, the N-cross control is used instead of the N-straight control so that the resonant point is passed while the speed is still low. In this situation of the use of an optional control function, the main PID control circuits 4 do not need to operate for control and the ABS function (N-cut by $\beta$) may be applied. The centrifugal compressor having a magnetic bearing normally has its operation range set between the first-order and second-order resonant points of bend mode, and therefore it is sufficient to use the optional ABS control following the passage of the first-order resonant point $Nc_3$ of bend mode. The extraction of the rotation-synchronous components by the ABS control function is desirably as deep as possible, and these values are ideally $x-x_N$ and $y-y_N$. The depth of extraction may be adjusted in terms of $x-\beta x_N$ and $y-\beta y_N$ through the adjustment of $\beta$ in the range of $0<\beta\leq1$.

Even in the case of a much higher operation speed near the second-order resonant point of bend mode, the optional control function activation plan can be established in the same manner as the first-order resonant point of bend mode.

The N-cross control, which is carried out for the suppression of resonant amplitude at the passage of the first-order or second-order resonant point of bend mode, is intended to reduce the imbalance-caused vibration through the reinforcement of the damping constant $C_N$, and therefore the suppression of rotation-synchronous vibration by the main PID control circuits 4 is not needed. Accordingly, the ABS function may also be applied.

Also in the case of shifting the resonant point by the N-straight control, the spring constant $K_N$ is reinforced. Therefore, the assistance of the PID control circuits 4 is not needed, and the ABS function may be applied.

In any case, it is ideal to have a full exertion of the ABS control function by setting $\beta=1$, however, it is practically necessary to set $\beta$ appropriately between 0 and 1 in order to prevent a disturbance caused by the switching of control functions. In practice, the control performance is tried by varying $\beta$ progressively from 0 to 1 thereby to find the best value for the ABS control.

In switching the control function from N-cross control to N-straight control, i.e., the ideal switching is from $\alpha\neq0$ and $\delta=0$ to $\alpha=0$ and $\delta\neq0$, it is desirable in practice to decrease $\alpha$ and increase $\delta$ progressively.

The values of these parameters $\alpha$, $\beta$, $\delta$ and $\gamma$ should be determined on a try-and-error basis by actually spinning the rotor as shown in the following example.

Setting of $\beta$: Adjust $\beta$ so that the exciting current decreases to about ⅓, for example, on the monitored current waveform.

Setting of $\alpha$: Adjust $\alpha$ so that the resonant amplitude falls to about ⅓, for example.

Setting of $\delta$: Adjust $\delta$ so that the vibration amplitude falls to about ½ at a rotor speed near the resonant point.

Setting of $\gamma$: Adjust gain $\gamma$ and phase $\phi$ so that the resonant amplitude falls to about ½, for example.

An alternative parameter setting manner is to get their expected values based on the mathematical simulation conducted in advance.

During the passage of the resonant point, the FF counter vibration function may further be added, although the ABS control plus N-cross control generally achieves a smaller resonant amplitude and smaller control current for the passage of the resonant point as compared with the imbalance offset performance of the FF control, as shown in FIG. 13. The FF control function must be applied carefully, since an imbalance component imposed additionally on the rotor will disturb the phase of offset action which is already adjusted by the FF control, and it can possibly exacerbate the vibration.

In the foregoing embodiment of item (9), the tracking filter 7 produces output signals for the exertion of the optional functions which are effective proportionally depending on the proportion factor $\beta$ for the ABS control, $\alpha$ for the N-cross control, $\delta$ for the N-straight control, and $\gamma$ for the FF control. These control parameters are varied in accordance with the schedule that is based on the rotor speed regions. Consequently, the magnetic bearing is operated always in the best condition of a small vibration and small current consumption over the entire speed range. The optional control functions relieve the duty of the PID control circuits 4, allowing them to be tuned easily. Specifically, the PID control circuits 4 can have a large lead phase so as to get rid of the oscillation of the servo feedback system attributable to increased gains in the high speed region.

The scheduled switching of the control parameters (gains) can readily be realized by using a computer (CPU) 20. Namely, as shown in FIG. 1, the rotor speed is imparted to the CPU 20, which then determines the gains in accordance with the stored schedule in response to the rotor speed.

Figure 22A:
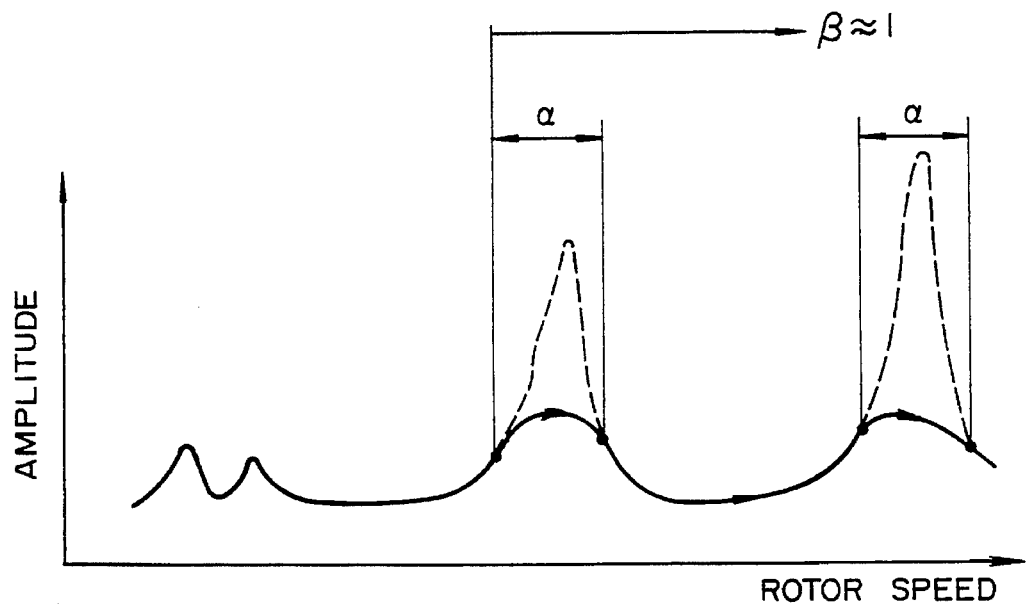
FIGS. 22A and 22B are diagrams showing another scheduled control applied to the embodiment of FIG. 1.

FIGS. 22A and B show examples of control plan based on scheduling.

Shown in FIG. 22A is a plan in which the N-cross control (indicated by $\alpha$) is applied during the passage of the first-order and second-order resonant points of bend mode, with the ABS control ($\beta$) being active continuously.

Figure 22B:
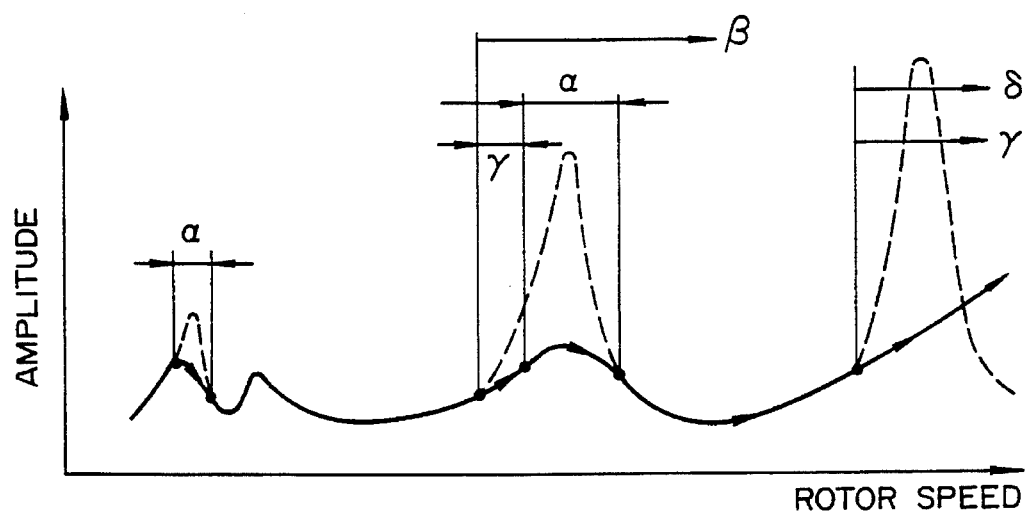

Shown in FIG. 22B is a plan in which the N-cross control ($\alpha$) is applied for the passage of the resonant point of rigid mode. When the rotor speed approaches the first-order resonant point of bend mode, the FF control (γ) for offsetting the imbalance is applied, and the N-cross control (α) is applied during the passage of the resonant point. The ABS control (β) is kept active. The rotor speed passes the the first-order resonant point of bend mode and precedes to the second-order resonant point, which is shifted upward in this example. The FF control (γ) for the imbalance offset is applied and, at the same time, the N-straight control (δ) is applied for the reinforcement of the spring constant. This example of scheduling is based on the fine division of the speed range for individual situations, in which optimal optional control functions are applied selectively.

A variety of control schedules can be made and stored in the memory of the CPU 20. Each schedule is readily formed in terms of the switching of the values of control parameters α β γ and δ.

Figure 23:
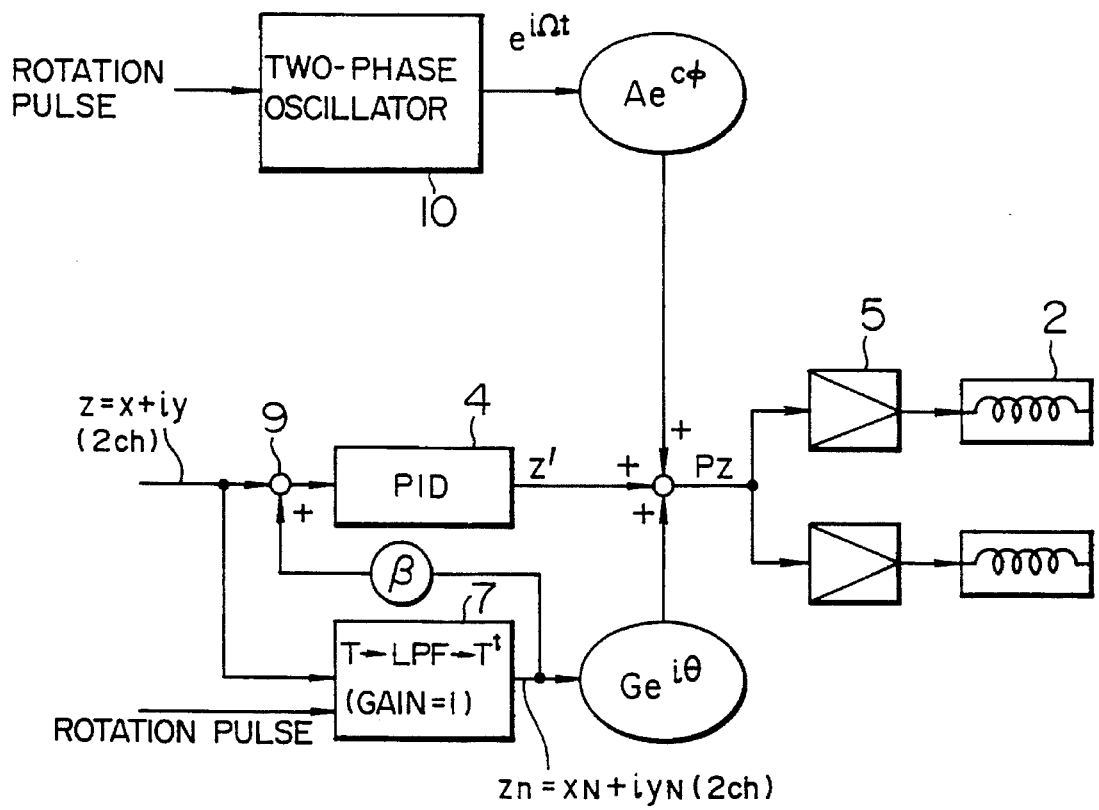
FIG. 23 shows the equivalent circuit of the system configuration shown in FIG. 1.

FIG. 23 shows the concept of the system configuration shown in FIG. 1, in which values are treated basically in terms of the x and y axis components to meet the practical arrangement, by introducing the complex representation.

The main PID control circuits 4, power amplifiers 5 and electromagnet windings 2 shown in FIG. 1 are designed in pairs for dealing with the detected displacement signals x and y of the x and y directions. For the simplicity of explanation, a complex number z is defined here as: z=x+iy. The real part represents a value of the x direction and the imaginary part represents a value of the y direction. Consequently, the diagram of the system is simplified as shown in FIG. 23.

For example, the outputs x' and y' of the PID control circuits 4 of the x and y directions shown in FIG. 1 are expressed as:

$$x'=\text{(PID control circuit)} \cdot x \quad \text{[Expression 3]}$$

$$y'=\text{(PID control circuit)} \cdot y$$

By defining a complex number z'=x'+iy', it is expressed as:

$$z'=\text{(PID control circuit)} \cdot z \quad \text{[Expression 4]}$$

The resulting single main control circuit is as shown in FIG. 23.

The simplification of expression through the introduction of the complex representation is also applicable to the N-cross circuit and N-straight circuit at the outputs of the tracking filter 7.

The output signals $x_N$ and $y_N$ of the tracking filter in FIG. 1 are transformed to the complex representation of FIG. 23 as:

$$z_N=x_N+iy_n \quad \text{[Expression 5]}$$

Similarly, the input signals $P_X$ and $P_Y$ to the power amplifiers are transformed to the complex representation as:

$$P_z=P_X+iP_Y$$

The power amplifier inputs are differed in FIG. 1 as:

$$P_X=-\alpha y_N+\delta x_N \quad \text{[Expression 7]}$$

$$P_Y=\alpha x_N+\delta y_N$$

Then, the complex power amplifier input $P_Z$ is expressed as:

$$P_Z=P_X+iP_Y=(-\alpha y_N+\delta x_N)+i(\alpha x_N+\delta y_N)= \delta(x_N+iy_N)+i\alpha(x_N+iy_N)=(\delta+i\delta)=z_N$$

In FIG. 23, the transfer function from the output $z_N$ of tracking filter 7 to $P_N$ is defined as:

$$G_0=G \cdot e^{i\theta} \quad \text{[Expression 9]}$$

Then, the power amplifier input $P_Z$ is expressed as:

$$P_Z=Ge^{i\theta}z_N \quad \text{[Expression 10]}$$

The comparison between the expressions 8 and 10 gives:

$$\delta+i\alpha=Ge^{i\theta} \quad \text{[Expression 11]}$$

Accordingly, the parameters δ and α have a relation:

$$\delta=G\cos\theta \quad \text{[Expression 12]}$$

$$\alpha=G\sin\theta$$

The parameter β of ABS control in FIG. 1 can be treated in the same manner, and eventually the two-channel expression for the x and y directions of FIG. 1 is simplified to the one-channel expression of FIG. 23 through the introduction of the complex representation.

The activation of N-cross control, i.e., α≠0 and δ=0, is equivalent to the setting of θ=90° in FIG. 23.

Similarly, the activation of N-straight control, i.e., α=0 and δ≠0, is equivalent to the setting of α=0°.

The two-phase oscillator 10 of FIG. 1 produces a cosine and sine wave signals for the x and y directions in response to the rotor speed Ω (rad/s), and the complex representation of these outputs are expressed based on the complex formula as:

$$\cos\Omega t+i\sin\Omega t=e^{i\Omega t} \quad \text{[Expression 13]}$$

$$\text{output}=e^{i\Omega t} \quad \text{[Expression 14]}$$

Considering the amplitude A and phase φ of the oscillator outputs results:

$$\text{output}=Ae^{i\Omega t} \quad \text{[Expression 15]}$$

By adjusting the values of A and φ, the control condition for offsetting the unknown imbalance is sought.

In this manner, the actual system having the x and y axis components shown in FIG. 1 is transformed to the conceptual one-channel expression of FIG. 23 through the introduction of the complex representation. The system is operated manually while monitoring the rotor speed, and the gain G and phase θ of tracking filter output in the feedback loop and the gain A and phase φ of the FF control are adjusted.

As shown for the concept in FIG. 23, the computer (CPU) monitors the rotor speed and varies the gains G and A and phases θ and φ in accordance with the predetermined schedule of these parameters, and consequently the magnetic bearing is operated always in the best condition of a small vibration and small current consumption.

Figure 24:
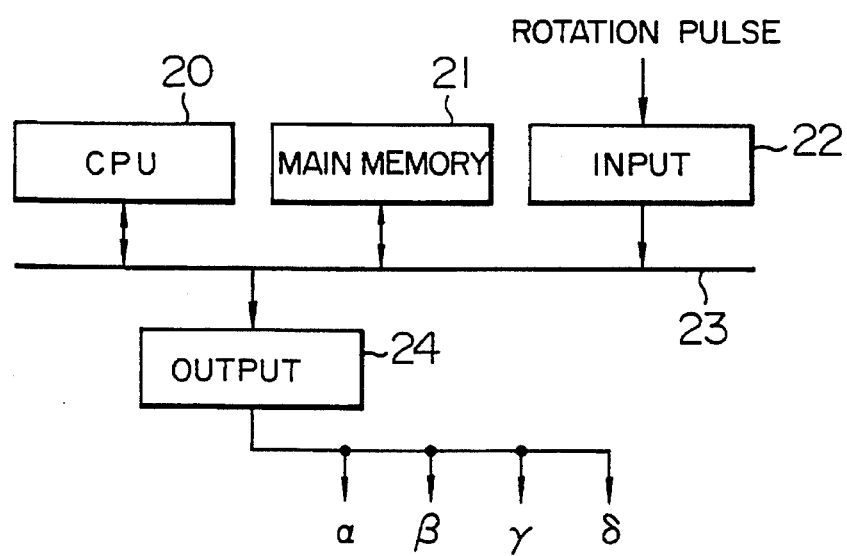
FIG. 24 shows the computer control system based on an embodiment of this invention.
Figure 25:
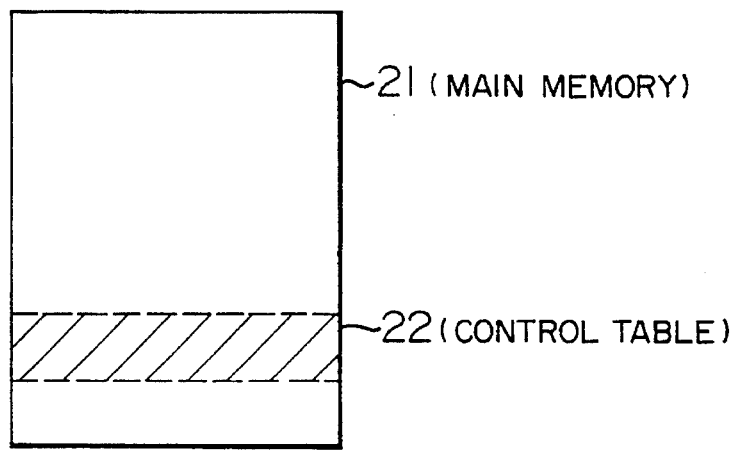
FIG. 25 shows an example of the memory table.

(10) Computer-Based Setting of α, β γ and δ (FIGS. 24, 25)

FIG. 24 shows in block diagram the arrangement of the control parameter setting circuit by means of the CPU 20 shown in FIG. 1 and FIG. 11. The CPU 20 along with a main memory 21, input device 22 and output device 24 connected through a common bus 23 constitute a computer. The main memory 21 stores a software-based operating system (OS) for the CPU operation and a program of scheduling for the magnetic bearing control. The input device 22 is a circuit for importing rotation pulses. The output device 24 is a circuit for delivering the control parameters α, β γ and δ determined by the CPU 20.

The CPU 20 runs the scheduling program, while fetching rotation pulses successively from the input device 22, and reads the parameters α, β γ and δ out of the memory 21 in accordance with the rotor speed. The parameters are delivered through the output device 24 to the control circuits and their control characteristics are established accordingly. Among the preceding embodiments, the arrangement of FIG. 10 sets δ only, the arrangement of FIG. 11 sets α and β, and the arrangement of FIG. 1 sets all of α, β, γ and δ.

FIG. 25 shows a schedule control table 22 formed in the main memory 21. The CPU 20 make access to this table 22 by addressing the memory based on the rotor speed, thereby reading out a set of parameters used for the control. As a variation of this embodiment, the scheduling program may be stored in a ROM which is provided separately from the main memory 21.

Figure 26:
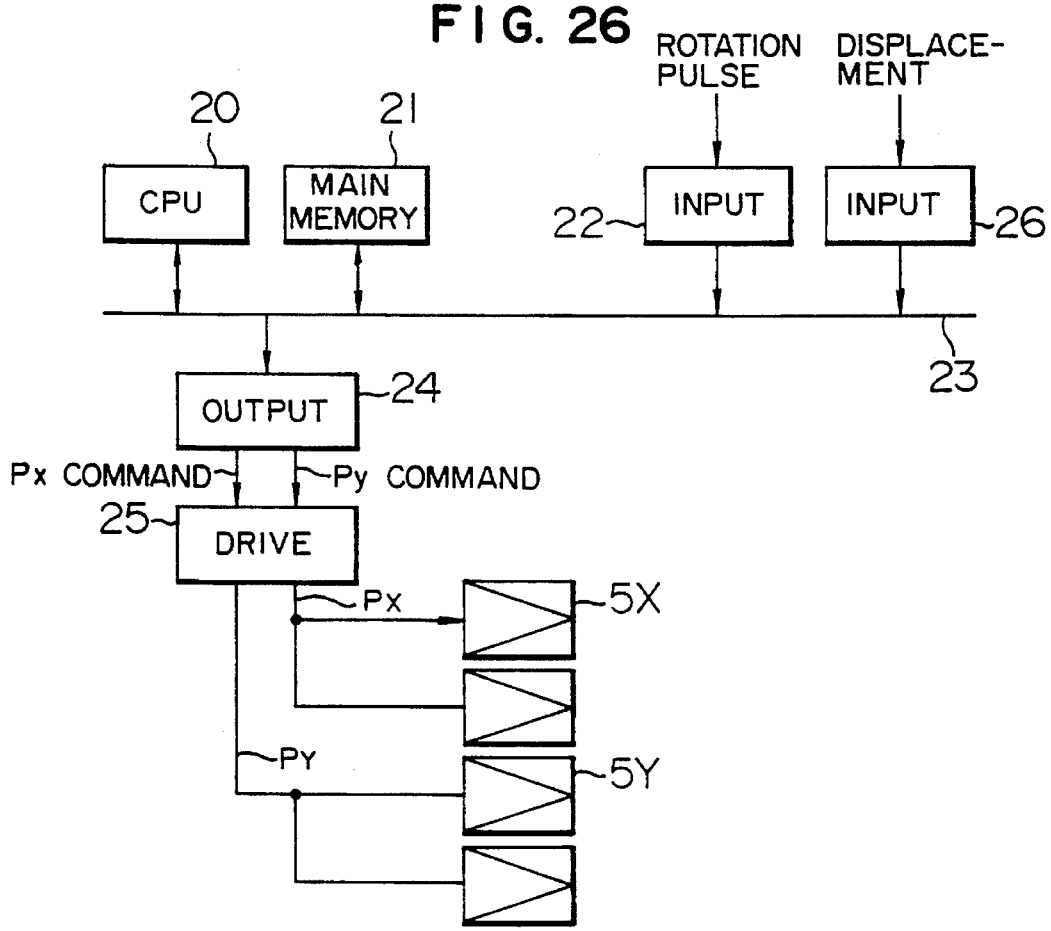
FIG. 26 shows the computer-based control system based on this invention.

(11) Computer Control (FIG. 26)

The circuit arrangements at the front of the power amplifiers 5X and 5Y in the preceding embodiments of FIG. 10, FIG. 11 and FIG. 1, which are all based on hardware design, can be substituted by the software-based processing implemented by a computer. FIG. 26 shows an embodiment of this case. A main memory 21 stores the scheduling program and other programs of the function of the PID control circuits 4, the function of the tracking filter 7, the function of each parameter setting device (for α, β, γ and δ), and the function of various arithmetic operations including addition and subtraction. An input device 22 imports the rotation pulse, another input device 26 imports the displacement signals, and a CPU 20 runs the scheduling program and control programs so as to carry out the process for the functions of the arrangements shown in FIG. 10, FIG. 11 or FIG. 1. The results of process is delivered as command signals Px and Py through an output device 24 to a driver 25. The driver 25 produces amplified signals $P_X$ and $P_Y$ from the command signals, and supplies the signals to the power amplifiers 5X and 5Y.

This embodiment accomplishes a complete software-based signal processing. As a variation of this embodiment, the scheduling program and control programs may be stored in a ROM.

(12) Feedback of $x_N$ and $y_N$ Under ABS Control (FIGS. 27–33)

This embodiment is a modified version of the ABS control. The output signals $x_N$ and $y_N$ of the rotation-synchronous tracking filter 7 is fed back (negative feedback) to the crude displacement signals x and y. A proportion factor β' which represents the amount of feedback relates with the β of the preceding embodiment of FIG. 1 as follows.

$$\beta = 1/(1+\beta')$$

Accordingly, in order for the ABS control to have a strong effect to extract an increased amount of the rotation-synchronous components $x_N$ and $y_N$ from the crude signal x and y, the β' is set to a large value. The condition of complete extraction is met when β' is infinity.

Figure 27:
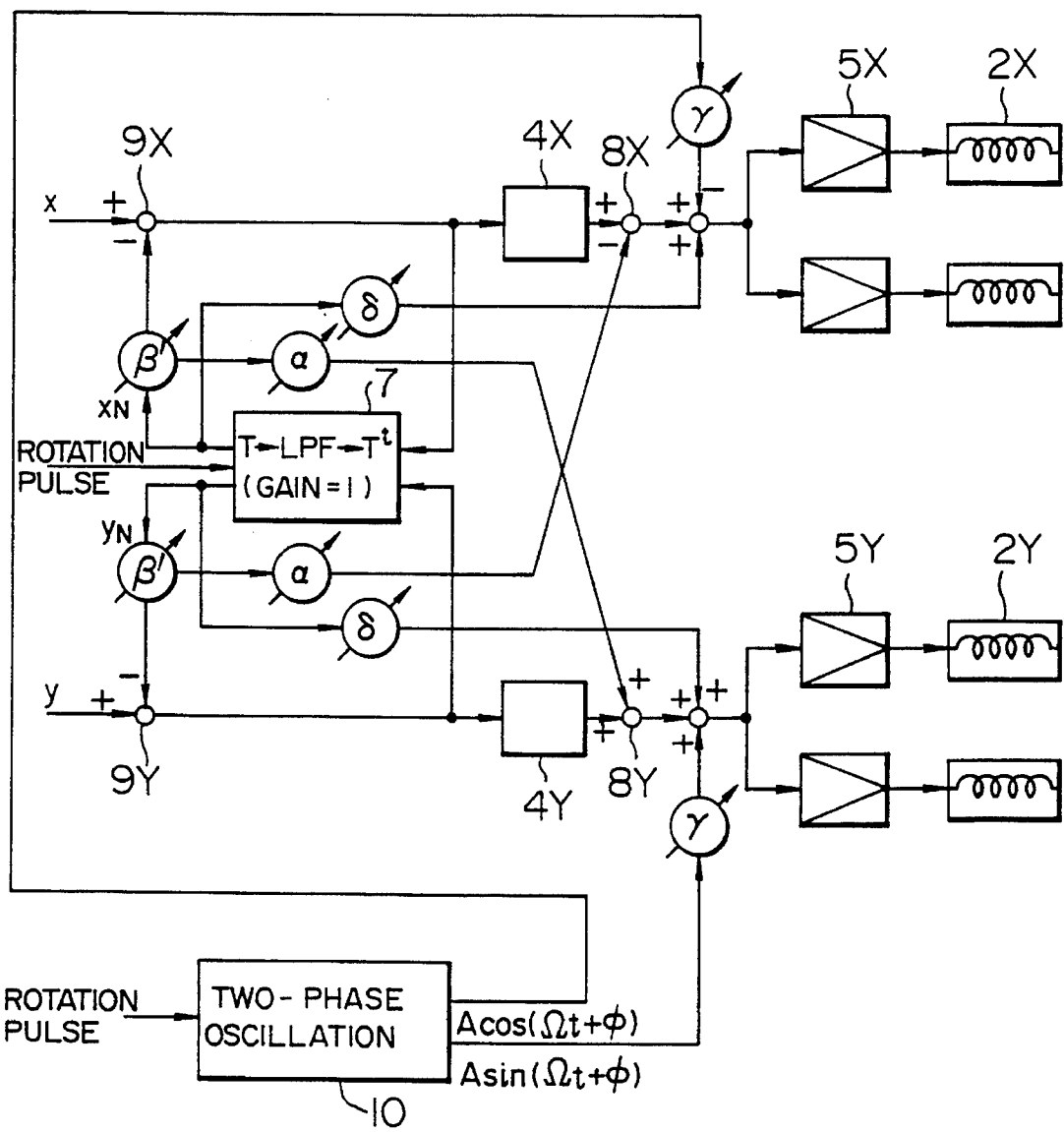
FIG. 27 shows an embodiment of this invention for carrying out the ABS control of feedback type, N-cross control, N-straight control, and FF control in combination.
Figure 28:
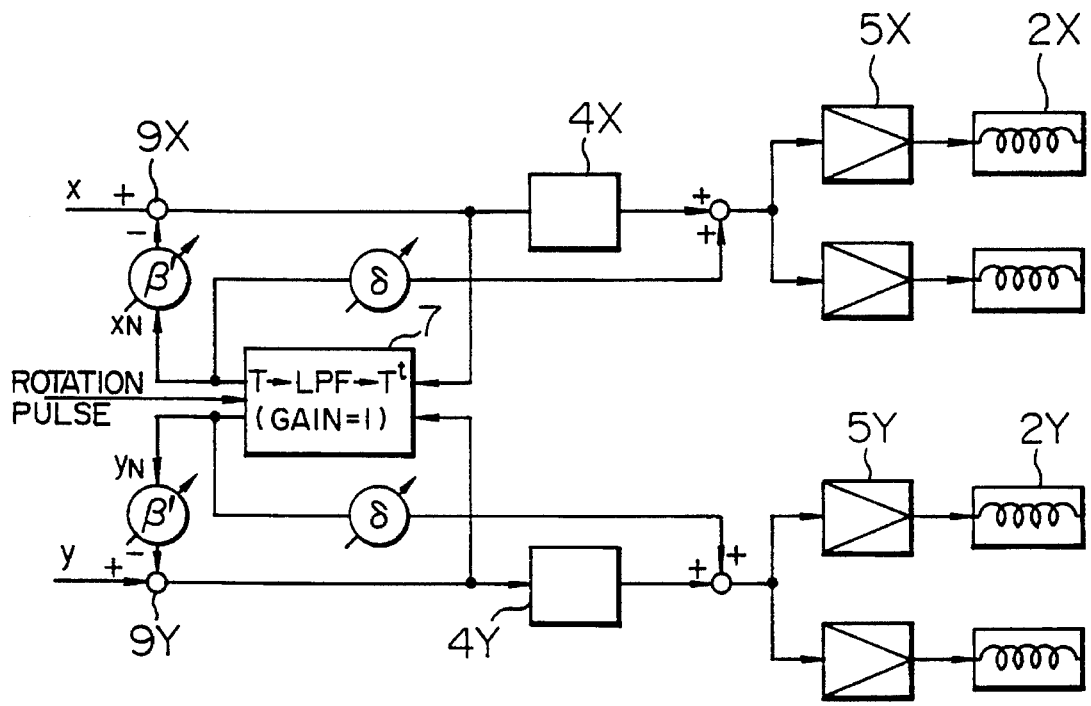
FIG. 28 shows an embodiment of this invention for carrying out the ABS control of feedback type and N-straight control in coaction.
Figure 30:
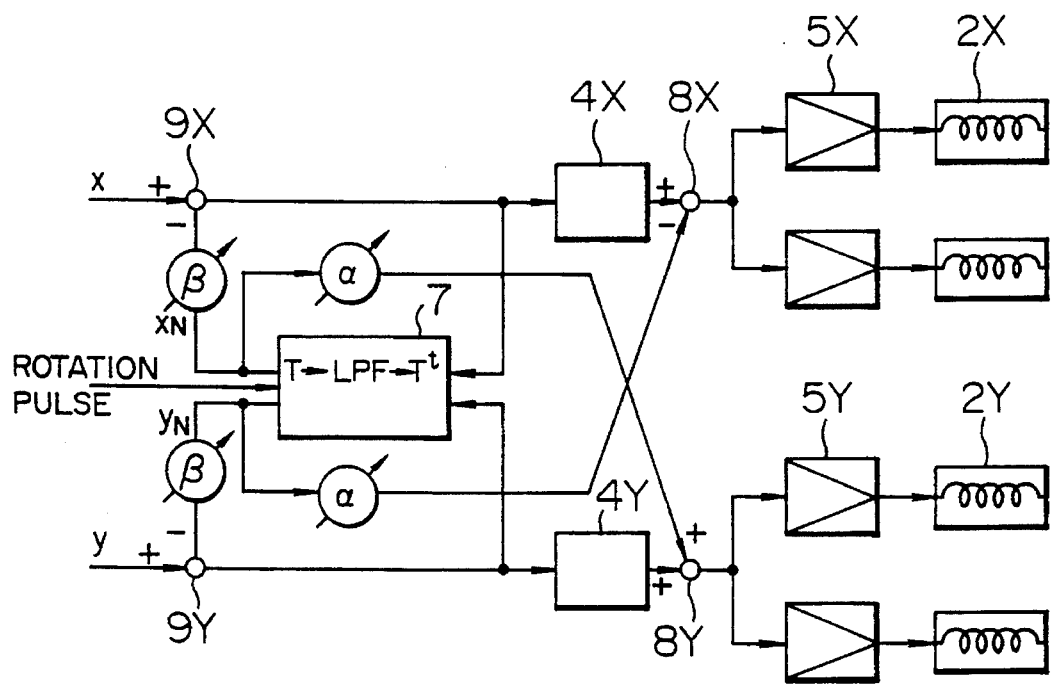
FIG. 30 shows an embodiment of this invention for carrying out the ABS control of feedback type and N-cross control in coaction.
Figure 29:
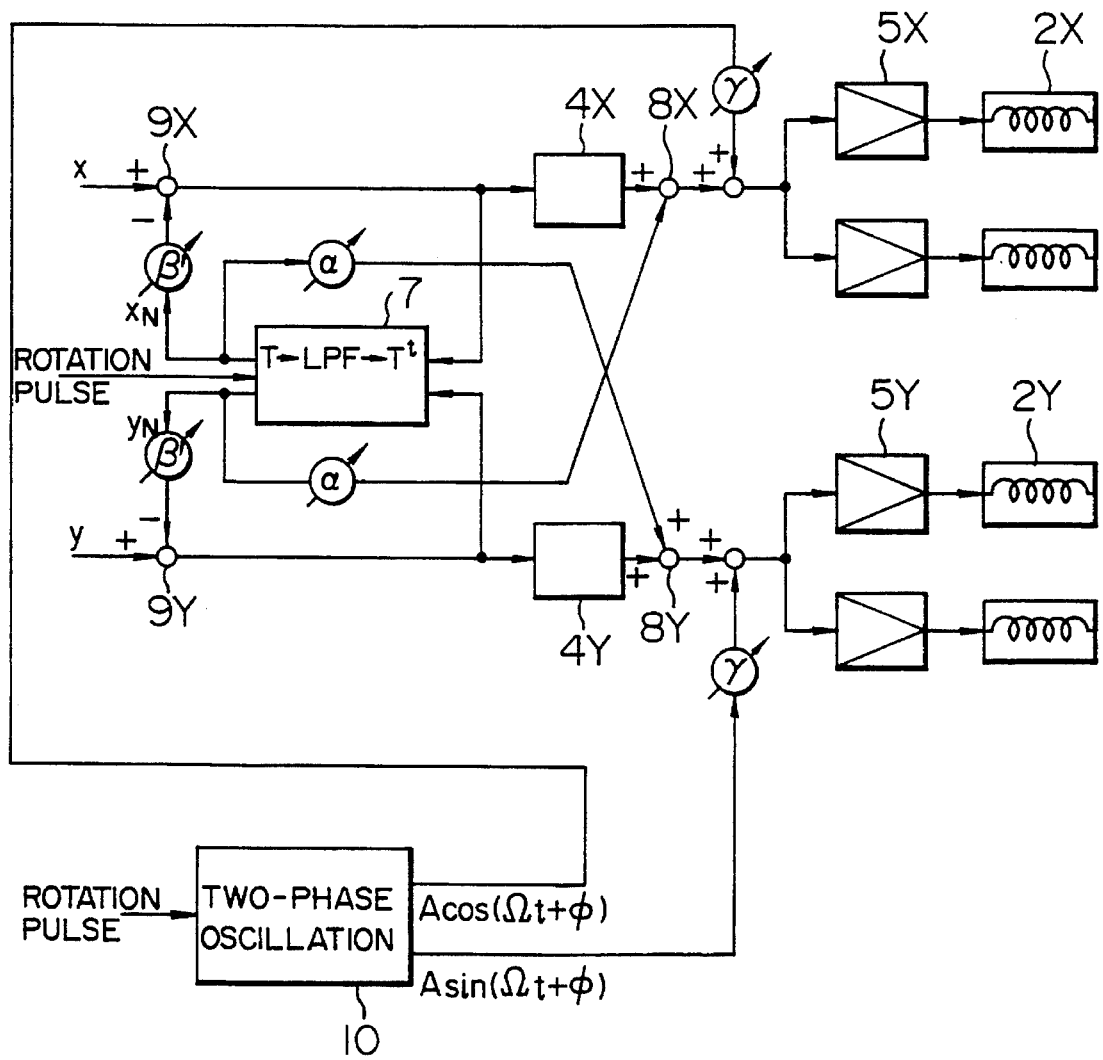
FIG. 29 shows an embodiment of this invention for carrying out the ABS control of feedback type, N-cross control and FF control in coaction.
Figure 31:
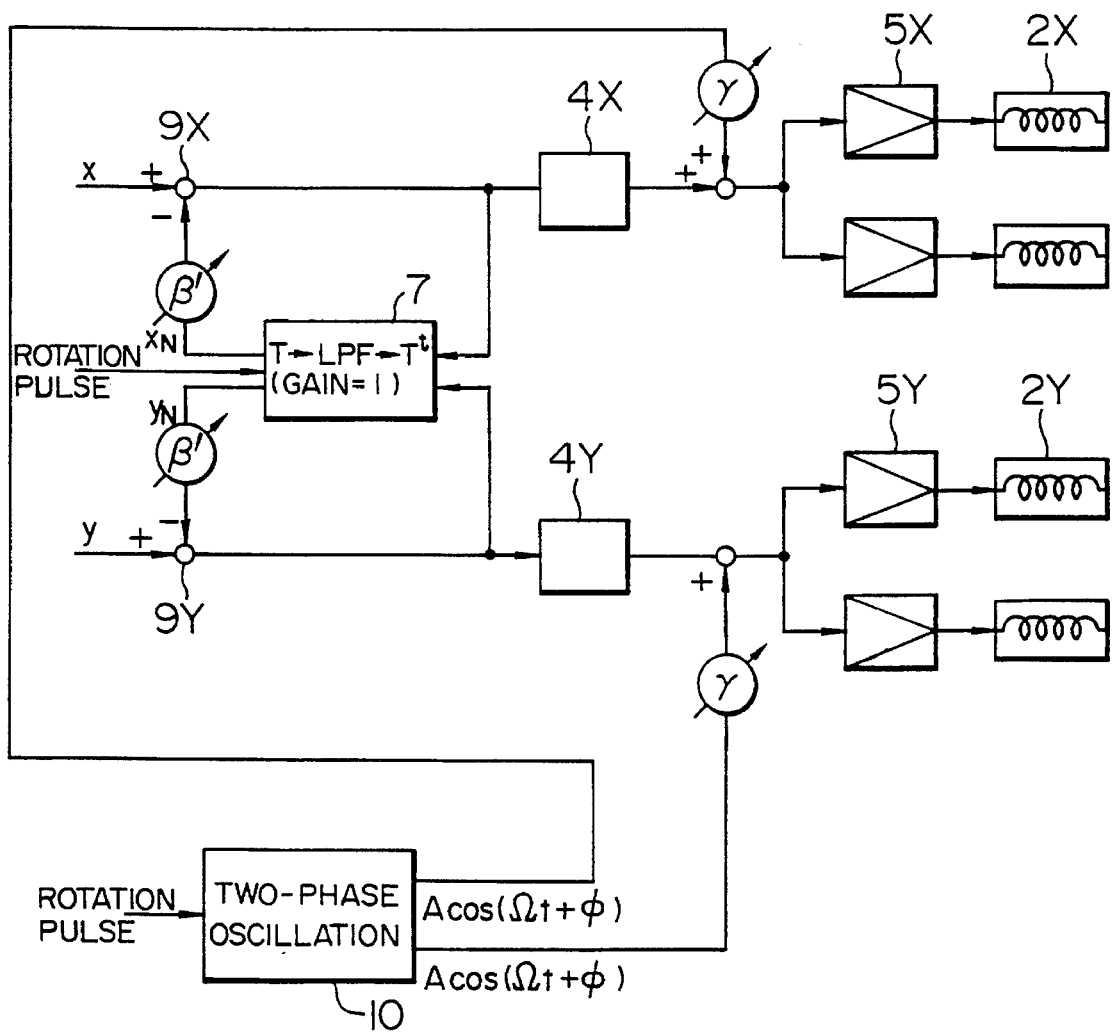
FIG. 31 shows an embodiment of this invention for carrying out the ABS control of feedback type and FF control in coaction.
Figure 32:
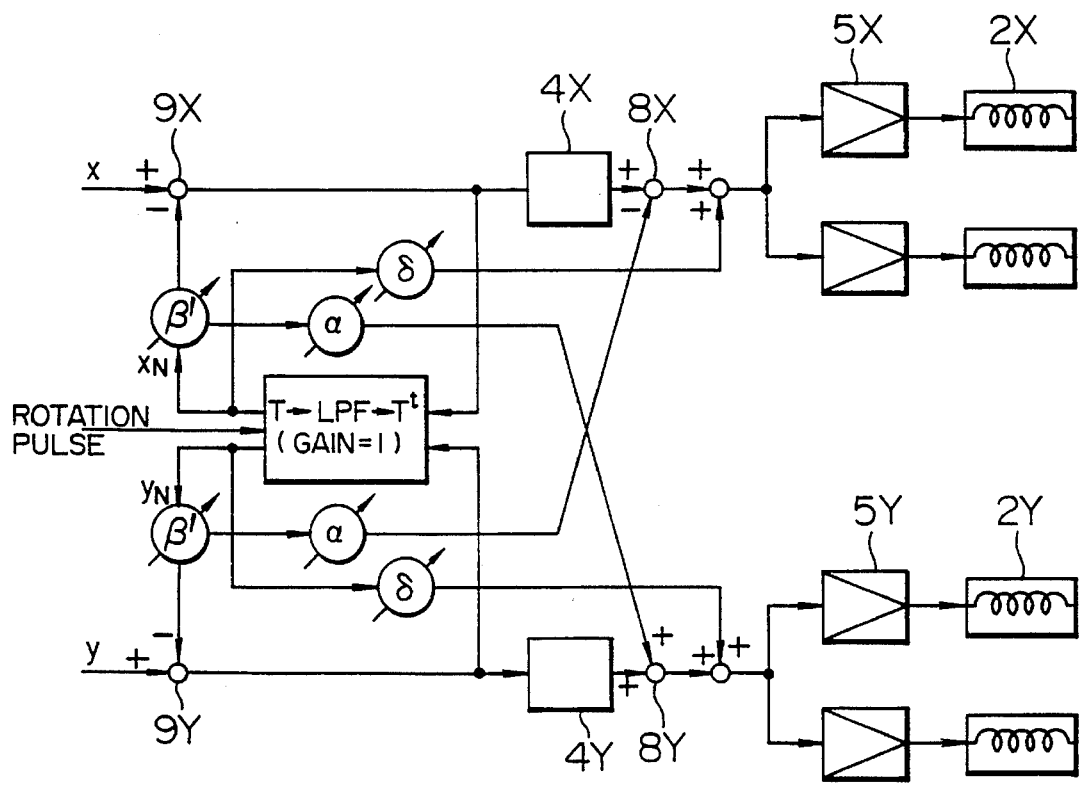
FIG. 32 shows an embodiment of this invention for carrying out the ABS control, N-cross control and N-straight control in coaction.
Figure 33:
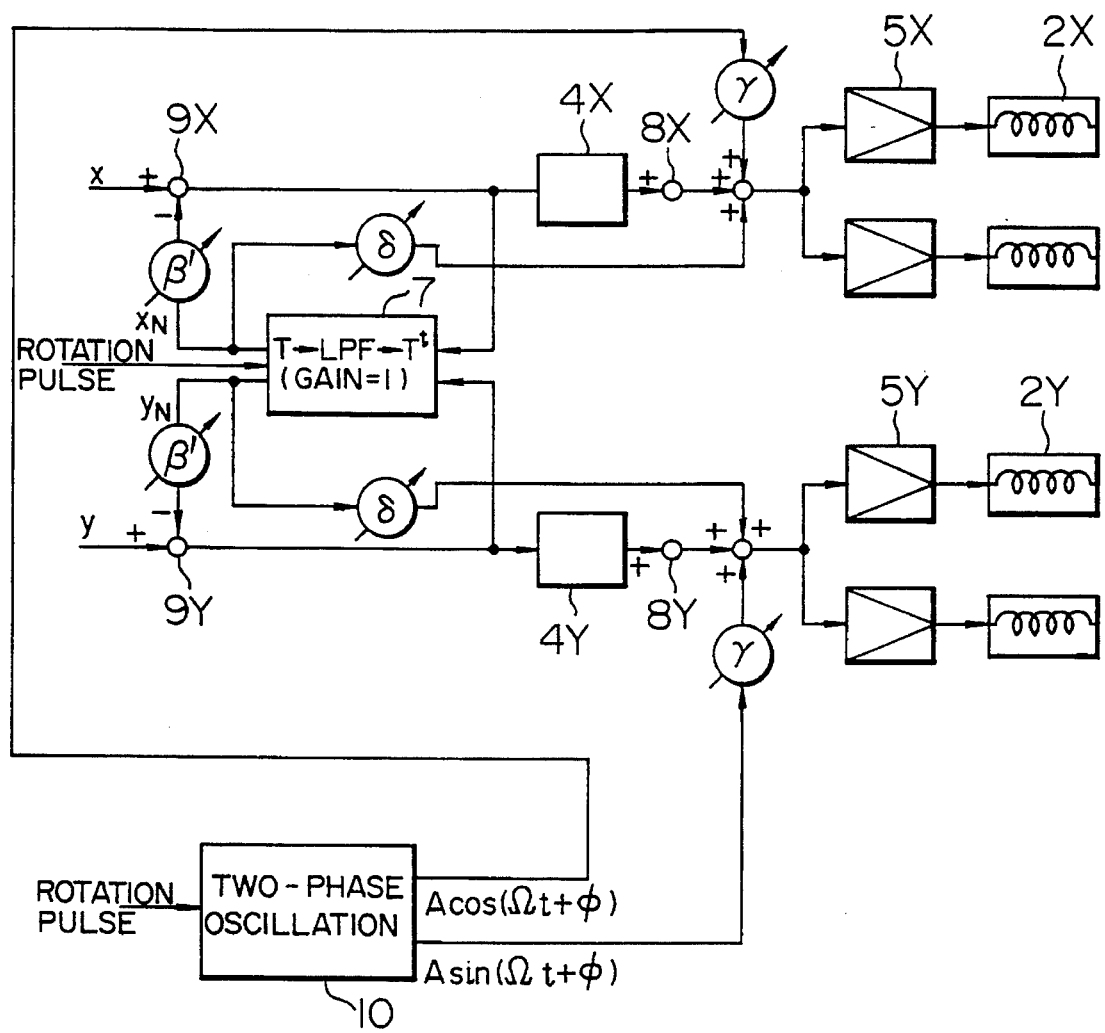
FIG. 33 shows an embodiment of this invention for carrying out the ABS control, N-straight control and FF control in coaction.

There are several embodiments relevant to the ABS control with this type of feedback, as shown in FIG. 27 through FIG. 33, in correspondence to the preceding embodiments. Their correspondence on the drawings are: FIG. 27 to FIG. 1; FIG. 28 to FIG. 16; FIG. 29 to FIG. 14; FIG. 30 to FIG. 11; FIG. 31 to FIG. 18; FIG. 32 to FIG. 17; FIG. 33 to FIG. 20.

The scheduled control operation based on the CPU 20 or the partial or total software-based signal processing explained in connection with FIG. 24 to FIG. 26 are of course applicable to the embodiments of the variant feedback ABS control explained here. It should be noted that symbol β is used instead of β' in the appended claims relevant to the ABS control with this type of feedback solely for the expedient of description.

According to this invention, the damping force against the confronting vibration at the passage of the resonant point is improved and it ensures the passage at a small resonant amplitude of the imbalance-caused vibration even if the rotor balance is not much accurate. In consequence, the rotor balancing work is simplified. The rotor can operate across the resonant points at a small vibration even if the imbalance of rotor is worsened due to the sticking of extraneous objects on the rotor during the rotation, and consequently the exciting current of the electromagnets can be reduced and the durability of the power amplifiers is improved.

Optimal control (small exciting current and small vibration) for each rotor speed range can be achieved by adjusting the values of the proportion factors α, β and γ depending on the rotor speed. Operating the magnetic bearing by keeping the exciting current small results in an extended life time of electronic component parts used in the power amplifiers. The magnetic bearing has its applied force reduced, and the life time of mechanical component parts is also extended.

The resonant point can be shifted upward by applying the N-straight control with the δ parameter, and consequently the rotor speed range can be extended upward.

We claim:

1. A method of controlling a magnetic bearing, said method comprising:
   providing an ABS control and N-cross control in coaction.

2. A method of controlling a magnetic bearing, said method comprising: ABS control, N-cross control and FF control in coaction.

3. A method of controlling a magnetic bearing, said method comprising: ABS control and N-straight control in coaction.

4. A method of controlling a magnetic bearing, said method comprising: ABS control, N-straight control and FF control in coaction.

5. A method of controlling a magnetic bearing, said method comprising: ABS control, N-cross control and N-straight control in coaction.

6. A method of controlling a magnetic bearing, said method comprising: ABS control and FF control in coaction.

7. A method of controlling a magnetic bearing based on the prosecution of determining in advance a control activation plan which is a set of control modes, each being any one of or any combination of ABS control, N-cross control, FF control and N-straight control, in relation with rotational speed regions of a rotor supported by said bearing, selecting a control mode in said plan depending on the actual rotor speed, and controlling said bearing in accordance with the selected control mode.

8. A method of controlling a magnetic bearing, said method comprising: N-cross control, N-straight control and FF control in arbitrary combination.

9. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ and produces a first control signal; second control means which receives a differential value between the y and a value proportional to the $y_N$ and produces a second control signal: first power amplifying means which amplifies a differential value between said first control signal and a value proportional to the $y_N$ and supplies a resulting exciting current to an electromagnet of said magnetic bearing; and second power amplifying means which amplifies a summed value of said second control signal and a value proportional to the $x_N$ and supplies a resulting exciting current to another electromagnet of said magnetic bearing;

a two-phase synchronous oscillator which produces a sine wave signal and cosine wave signal in synchronism with rotation pulses; means of adding a value proportional to said cosine wave signal to the input or output of said first control means: and means of adding a value proportional to said sine wave signal to the input or output of said second control means.

10. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ by a proportion factor $\beta$ and produces a first control signal; second control means which receives a differential value between the y and a value proportional to the $y_N$ by a proportion factor $\beta$ and produces a second control signal; first power amplifying means which amplifies a differential value between said first control signal and a value proportional to the $y_N$ by a proportion factor $\alpha$ and supplies a resulting exciting current to an electromagnet of said magnetic bearing; second power amplifying means which amplifies a summed value of said second control signal and a value proportional to the $x_N$ by said proportion factor $\alpha$ and supplies a resulting exciting current to another electromagnet of said magnetic bearing; and means of setting said proportion factors $\alpha$ and $\beta$ variably in accordance with the rotor speed;

a two-phase synchronous oscillator which produces a sine wave signal and cosine wave signal in synchronism with rotation pulses: means of adding a value proportional to said cosine wave signal by a proportion factor $\gamma$ to an input or output of said first control means; and means of adding a value proportional to said sine wave signal by said proportion factor $\gamma$ to an input or output of said second control means, said factor setting means setting said proportion factor $\gamma$, variably in accordance with the rotor speed.

11. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ and produces a first control signal; second control means which receives a differential value between the y and a value proportional to the $y_N$ and produces a second control signal; first power amplifying means which amplifies a summed value of said first control signal and a value proportional to the $x_N$ and supplies a resulting exciting current to an electromagnet of said magnetic bearing; and second power amplifying means which amplifies a summed value of said second control signal and a value proportional to the $y_N$ and supplies a resulting exciting current to another electromagnet of said magnetic bearing.

12. An apparatus for controlling a magnetic bearing comprising: displacement detection means which detects displacement values x and y from reference positions on two orthogonal axes perpendicular to the rotational axis of a rotor supported by said bearing; first and second control means which produce a first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ thereby to produce said first input signal; second differential means which evaluates a differential value between the y and a value proportional to the $y_N$ thereby to produce said second input signal; first power amplifying means which amplifies a summed value of said first control signal and a value proportional to the $x_N$ and supplies a resulting exciting current to an electromagnet of said magnetic bearing; and second power amplifying means which amplifies a summed value of said second control signal and a value proportional to the $y_N$ and supplies a resulting exciting current to another electromagnet of said magnetic bearing.

13. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ by a proportion factor $\beta$ and produces a first control signal; second control means which receives a differential value between the y and a value proportional to the $y_N$ by said proportion factor $\beta$ and produces a second control signal; first power amplifying means which amplifies a summed value of said first control signal and a value proportional to the $x_N$ by a proportion factor $\delta$ and supplies a resulting exciting current to an electromagnet of said magnetic bearing; second power amplifying means which amplifies a summed value of said second control signal and a value proportional to the $y_N$ by said proportion factor $\delta$ and supplies a resulting exciting current to another electromagnet of said magnetic bearing; and means of setting said proportion factors B and $\delta$ variably in accordance with the rotor speed.

14. A magnetic bearing control apparatus according to claim 13 further including a two-phase synchronous oscillator which produces a sine wave signal and cosine wave signal in synchronism with rotation pulses; means of adding a value proportional to said cosine wave signal by a proportion factor $\gamma$ to the input or output of said first control means; and means of adding a value proportional to said sine wave signal by said proportion factor $\gamma$ to the input or output of said second control means, said factor setting means setting said proportion factor $\gamma$ variably in accordance with the rotor speed.

15. An apparatus for controlling a magnetic bearing comprising: displacement detection means which detects displacement values x and y from reference positions on two orthogonal axes perpendicular to the rotational axis of a rotor supported by said bearing, first and second control means which produce first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ by a proportion factor β thereby to produce said first input signal; second differential means which evaluates a differential value between the y and a value proportional to the $y_N$ by said proportion factor β thereby to produce said second input signal; first power amplifying means which amplifies a summed value of said first control signal and a value proportional to the $x_N$ by a proportion factor δ and supplies a resulting exciting current to an electromagnet of said magnetic bearing; second power amplifying means which amplifies a summed value of said second control signal and a value proportional to the $y_N$ by said proportion factor δ and supplies a resulting exciting current to another electromagnet of said magnetic bearing; and means of setting said proportion factors β and γ variably in accordance with the rotor speed.

16. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ and produces a first control signal; second control means which receives a differential value between the y and a value proportional to the $y_N$ and produces a second control signal; first power amplifying means which amplifies a summed value of said first control signal and a value proportional to the $x_N$ and supplies a resulting exciting current to an electromagnet of said magnetic bearing; and second power amplifying means which amplifies a summed value of said second control signal and a value proportional to the $y_N$ and supplies a resulting exciting current to another electromagnet of said magnetic bearing;

a two-phase synchronous oscillator which produces a sine wave signal and cosine wave signal in synchronism with rotation pulses; means of adding a value proportional to said cosine wave signal to the input or output of said first control means; and means of adding a value proportional to said sine wave signal to the input or output of said second control means.

17. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ by a proportion factor β and produces a first control signal; second control means which receives a differential value between the y and a value proportional to the $y_N$ by said proportion factor β and produces a second control signal; first power amplifying means which amplifies a composite value of a differential value between said first control signal and a value proportional to the $y_N$ by a proportion factor α and a value proportional to the $x_N$ by a proportion factor δ, and supplies a resulting exciting current to an electromagnet of said magnetic bearing; and second power amplifying means which amplifies a composite value of a differential value between said second control signal and a value proportional to the $x_N$ by said proportion factor α and a value proportional to the $y_N$ by said proportion factor δ, and supplies a resulting exciting current to another electromagnet of said magnetic bearing.

18. A magnetic bearing control apparatus according to claim 17 further including a two-phase synchronous oscillator which produces a sine wave signal and cosine wave signal in synchronism with rotation pulses by being phased variably with respect to the rotation pulses; means of adding a value proportional to said cosine wave signal by a proportion factor γ to the input or output of said first control means; and means of adding a value proportional to said sine wave signal said proportion factor γ to the input or output of said second control means.

19. A magnetic bearing control apparatus according to claim 18, wherein each of said proportion factors α, β, γ and δ is set to be an arbitrary value which is greater than or equal to 0 and smaller than or equal to 1.

20. A magnetic bearing control apparatus according to claim 18, wherein the rotor speed has a range in which resonant points of the first-order, second-order, third-order and fourth-order are included.

21. A magnetic bearing control apparatus according to claim 18, wherein each of said proportion factors α, β, γ and δ is set by means of a processor in response to the rotor speed by making reference to a table which stores the relation between values of proportion factors and values of rotor speed.

22. A magnetic bearing control apparatus according to claim 18, wherein the operation of said filter means and said first and second control means and the operation for producing the inputs to said first and second power amplifying means are implemented by means of a processor.

23. An apparatus for controlling a magnetic bearing comprising: displacement detection means which detects displacement values x and y from reference positions on two orthogonal axes perpendicular to the rotational axis of a rotor supported by said bearing; first and second control means which produce a first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ (by proportion factor β) thereby to produce said first input signal; second differential means which evaluates a differential value between the y and a value proportional to the $y_N$ (by proportion factor β) thereby to produce said second input signal; first power amplifying means which amplifies a composite value of a differential value between said first control signal and a value proportional to the $y_N$ (by proportion factor α) and a value proportional to the $x_N$ (by proportion factor δ), and supplies a resulting exciting current to a electromagnet of said magnetic bearing; and second power amplifying means which amplifies a composite value of a differential value between said second control signal and a value proportional to the $x_N$ (by proportion factor α) and a value proportional to the $y_N$ (by proportion factor δ), and supplies a resulting exciting current to another electromagnet of said magnetic bearing.

24. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ by a proportion factor $\beta$ and produces a first control signal; second control means which receives a differential value between the y and a value proportional to the $y_N$ by said proportion factor $\beta$ and produces a second control signal; first power amplifying means which amplifies a composite value of a differential value between said first control signal and a value proportional to the $y_N$ by a proportion factor $\alpha$ and a value proportional to the $x_N$ by a proportion factor $\delta$, and supplies a resulting exciting current to an electromagnet of said magnetic bearing; second power amplifying means which amplifies a composite value of a differential value between said second control signal and a value proportional to the $x_N$ by said proportion factor $\alpha$ and a value proportional to the $y_N$ by said proportion factor $\delta$, and supplies a resulting exciting current to another electromagnet of said magnetic bearing; and means of setting said proportion factors $\alpha$, $\beta$ and $\delta$ variably in accordance with the rotor speed.

25. A magnetic bearing control apparatus according to claim 24 further including a two-phase synchronous oscillator which produces a sine wave signal and cosine wave signal in synchronism with rotation pulses; means of adding a value proportional to said cosine wave signal by a proportion factor $\gamma$ to the input or output of said first control means; and means of adding a value proportional to said sine wave signal by a proportion factor $\gamma$ to the input or output of said second control means, said factor setting means setting said proportion factor $\gamma$ variably in accordance with the rotor speed.

26. An apparatus for controlling a magnetic bearing comprising: displacement detection means which detects displacement values x and y from reference positions on two orthogonal axes perpendicular to the rotational axis of a rotor supported by said bearing; first and second control means which produce first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ by a proportion factor $\beta$ thereby to produce said first input signal; second differential means which evaluates a differential value between the y and a value proportional to the $y_N$ by said proportion factor $\beta$ thereby to produce said second input signal; first power amplifying means which amplifies a summed value of a differential value between said first control signal and a value proportional to the $y_N$ by a proportion factor $\alpha$ and a value proportional to the $x_N$ by a proportion factor $\delta$, and supplies a resulting exciting current to an electromagnet of said magnetic bearing; and second power amplifying means which amplifies a summed value of a differential value between said second control signal and a value proportional to the $x_N$ by said proportion factor $\alpha$ and a value proportional to the $y_N$ by said proportion factor $\delta$, and supplies a resulting exciting current to another electromagnet of said magnetic bearing; and means of setting said proportion factors $\alpha$, $\beta$ and $\delta$ variably in accordance with the rotor speed.

27. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ (by proportion factor $\beta$) and produces a first control signal; second control means which receives a differential value between the y and a value proportional to the $y_N$ (by proportion factor $\beta$) and produces a second control signal; first power amplifying means which amplifies said first control signal and supplies a resulting exciting current to a electromagnet of said magnetic bearing; second power amplifying means which amplifies said second control signal and supplies a resulting exciting current to another electromagnet of said magnetic bearing; a two-phase synchronous oscillator which produces a sine wave signal and cosine wave signal in synchronism with rotation pulses; means of adding a value proportional to said cosine wave signal (by proportion factor $\gamma$) to the input or output of said first control means; and means of adding a value proportional to said sine wave signal (by proportion factor $\gamma$) to the input or output of said second control means.

28. An apparatus for controlling a magnetic bearing comprising: displacement detection means which detects displacement values x and y from reference positions on two orthogonal axes perpendicular to the rotational axis of a rotor supported by said bearing; first and second control means which produce a first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ (by proportion factor $\beta$) thereby to produce said first input signal; second differential means which evaluates a differential value between the y and a value proportional to the $y_N$ (by proportion factor $\beta$) thereby to produce said second input signal; first power amplifying means which amplifies said first control signal and supplies a resulting exciting current to a electromagnet of said magnetic bearing; second power amplifying means which amplifies said second control signal and supplies a resulting exciting current to another electromagnet of said magnetic bearing; a two-phase synchronous oscillator which produces a sine wave signal and cosine wave signal in synchronism with rotation pulses; means of adding a value proportional to said cosine wave signal (by proportion factor $\gamma$) to the input or output of said first control means; and means of adding a value proportional to said sine wave signal (by proportion factor $\gamma$) to the input or output of said second control means.

29. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which receives a differential value between the x and a value proportional to the $x_N$ by a proportion factor $\beta$ and produces a first control signal; second control means which receives a differential value between the y and a value proportional to the $y_N$ by said proportion factor $\beta$ and produces a second control signal; first power amplifying means which amplifies said first control signal and supplies a resulting exciting current to a electromagnet of said magnetic bearing; second power amplifying means which amplifies said second control signal and supplies a resulting exciting current to another electromagnet of said magnetic bearing; a two-phase synchronous oscillator which produces a sine wave signal and cosine wave signal in synchronism with rotation pulses; means of adding a value proportional to said cosine wave signal by a proportion factor $\gamma$ to the input or output of said first control means; means of adding a value proportional to said sine wave signal by said proportion factor $\gamma$ to the input or output of said second control means; and means of setting said proportion factors $\beta$ and $\gamma$ variably in accordance with the rotor speed.

30. An apparatus for controlling a magnetic bearing comprising: displacement detection means which detects displacement values x and y from reference positions on two orthogonal axes perpendicular to the rotational axis of a rotor supported by said bearing; first and second control means which produce a first and second control signals, respectively; filter means for extracting rotation-synchronous components $x_N$ and $y_N$ from a first input signal to said first control means and a second input signal to said second control means; first differential means which evaluates a differential value between the x and a value proportional to the $x_N$ by a proportion factor $\beta$ thereby to produce said first input signal; second differential means which evaluates a differential value between the y and a value proportional to the $y_N$ by said proportion factor $\beta$ thereby to produce said second input signal; first power amplifying means which amplifies said first control signal and supplies a resulting exciting current to a electromagnet of said magnetic bearing; second power amplifying means which amplifies said second control signal and supplies a resulting exciting current to another electromagnet of said magnetic bearing; a two-phase synchronous oscillator which produces a sine wave signal and cosine wave signal in synchronism with rotation pulses; means of adding a value proportional to said cosine wave signal by said proportion factor $\gamma$ to the input or output of said first control means; means of adding a value proportional to said sine wave signal by a proportion factor $\gamma$ to the input or output of said second control means; and means of setting said proportion factors $\beta$ and $\gamma$ variably in accordance with the rotor speed.

31. An apparatus for controlling a magnetic bearing comprising: displacement detection means which detects displacement values x and y from reference positions on two orthogonal axes perpendicular to the rotational axis of a rotor supported by said bearing; first and second control means which produce a first and second control signals, respectively; filter means for extracting rotation-synchronous components $x_N$ and $y_N$ from a first input signal to said first control means and a second input signal to said second control means; power amplifying means which amplifies a composite signal of a differential value between said first control signal and a value proportional to the $y_N$ by a proportion factor $\alpha$ and a value proportional to the $x_N$ by a proportion factor $\delta$ and supplies a resulting exciting current to a electromagnet of said magnetic bearing; a two-phase synchronous oscillator which produces a sine wave signal and cosine wave signal in synchronism with rotation pulses; means of adding a value proportional to said cosine wave signal by a proportion factor $\gamma$ to the input or output of said first control means; means of adding a value proportional to said sine wave signal by said proportion factor $\gamma$ to the input or output of said second control means; and means of setting said proportion factors $\beta$ and $\gamma$ variably in accordance with the rotor speed.

32. A magnetic bearing control apparatus according to claim 31 wherein said means of setting further sets said proportion factors $\alpha$ variably in accordance with the rotor speed.

33. An apparatus for controlling a magnetic bearing comprising: displacement detection means which detects displacement values x and y from reference positions on two orthogonal axes perpendicular to the rotational axis of a rotor supported by said bearing; filter means for extracting rotation-synchronous components $x_N$ and $y_N$ from the detected displacement values x and y; first control means which produces a first control signal from the detected displacement value x; second control means which produces a second control signal from the detected displacement value y; first power amplifying means which amplifies a summed value of said first control signal and a value proportional to the $x_N$ (by proportion factor $\delta$) and supplies a resulting exciting current to a electromagnet of said magnetic bearing; and second power amplifying means which amplifies a summed value of said second control signal and a value proportional to the $y_N$ (by proportion factor $\delta$) and supplies a resulting exciting current to another electromagnet of said magnetic bearing.

* * * * *